United States Patent
Venkataramana

(10) Patent No.: US 10,656,642 B2
(45) Date of Patent: May 19, 2020

(54) SYSTEMS AND METHODS FOR PROVIDING PREDICTED MODE CHANGE DATA FOR DECOUPLED VERTICAL NAVIGATION (VNAV) AND LATERAL NAVIGATION (LNAV) AUTOPILOT OPERATIONS

(71) Applicant: HONEYWELL INTERNATIONAL INC., Morris Plains, NJ (US)

(72) Inventor: Kiran Mancheiah Venkataramana, Bangalore (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 361 days.

(21) Appl. No.: 15/819,120

(22) Filed: Nov. 21, 2017

(65) Prior Publication Data

US 2019/0155280 A1 May 23, 2019

(51) Int. Cl.
*G05D 1/00* (2006.01)
*G05D 1/10* (2006.01)
(Continued)

(52) U.S. Cl.
CPC .......... *G05D 1/0061* (2013.01); *B64D 43/00* (2013.01); *G05D 1/0607* (2013.01); *G05D 1/101* (2013.01); *G08G 5/025* (2013.01); *G08G 5/003* (2013.01)

(58) Field of Classification Search
CPC .... G05D 1/0061; G05D 1/101; G05D 1/0607; G08G 5/025; G08G 5/003; B64D 43/00
See application file for complete search history.

(56) References Cited

U.S. PATENT DOCUMENTS 3,705,306 A  12/1972 Lydon et al.
3,980,258 A  9/1976 Simeon
(Continued)

FOREIGN PATENT DOCUMENTS

WO  2016196758 A1  12/2016

OTHER PUBLICATIONS

Duan,P et al.; Improving mode awareness of the VNAV function with a Multiple Hypothesis Prediction method; 2015 IEEE Aerospace Conference, Big Sky, MT, 2015, pp. 1-16.
(Continued)

*Primary Examiner* — Russell Frejd
(74) *Attorney, Agent, or Firm* — Lorenz & Kopf, LLP

(57) ABSTRACT

A method for providing mode data during operation of a Flight Management System (FMS) using a Vertical Navigation (VNAV) Autopilot Mode, is provided. When the FMS has disengaged a Lateral Navigation (LNAV) Autopilot Mode, the method detects a changed aircraft position indicating divergence from a flight path, wherein the changed aircraft position comprises a current aircraft position; calculates a future aircraft position for VNAV Autopilot Mode disengagement, based on the changed aircraft position, a predicted cross-track error, and the divergence from the flight path; and presents the changed aircraft position and the future aircraft position when operating in the VNAV Autopilot Mode, via a display device. When the future aircraft position is not on the flight path, the method disengages the VNAV Autopilot Mode, based on the changed aircraft position and the future aircraft position; calculates a descent path for the aircraft, after disengagement; and presents the descent path.

20 Claims, 17 Drawing Sheets

(51) Int. Cl.
*B64D 43/00* (2006.01)
*G05D 1/06* (2006.01)
*G08G 5/02* (2006.01)
*G08G 5/00* (2006.01)

(56) References Cited

U.S. PATENT DOCUMENTS

| | | | |
|---|---|---|---|
| 4,021,009 A | 5/1977 | Baker et al. | |
| 4,037,086 A | 7/1977 | Foster et al. | |
| 5,337,982 A | 8/1994 | Sherry | |
| 5,739,770 A | 4/1998 | Liden | |
| 6,085,129 A | 7/2000 | Schardt et al. | |
| 6,112,141 A | 8/2000 | Briffe et al. | |
| 6,308,116 B1 * | 10/2001 | Ricks | G01C 23/005 244/175 |
| 6,405,124 B1 | 6/2002 | Hutton | |
| 8,311,687 B2 | 11/2012 | Bakker | |
| 8,838,299 B2 | 9/2014 | Deker et al. | |
| 2005/0027408 A1 | 2/2005 | Donoghue et al. | |
| 2006/0149432 A1 | 7/2006 | Robinson | |
| 2008/0172149 A1 | 7/2008 | Rouquette et al. | |
| 2009/0177341 A1 | 7/2009 | Deker et al. | |
| 2015/0019047 A1 * | 1/2015 | Chandrashekarappa | B64D 43/00 701/3 |
| 2016/0180715 A1 * | 6/2016 | Burke | G08G 5/0008 701/467 |
| 2017/0291691 A1 * | 10/2017 | Barral | B64C 13/18 |
| 2018/0149493 A1 * | 5/2018 | Bleeg | G01C 23/005 |

OTHER PUBLICATIONS

Shish, K., et al.; Trajectory Prediction and Alerting for Aircraft Mode and Energy State Awareness; American Institute of Aeronautics and Astronautics, Jan. 2015, pp. 1-19.

European Patent Office, European Extended Search Report for Application No. 18207126.6 dated Apr. 12, 2019.

* cited by examiner

SYSTEMS AND METHODS FOR PROVIDING PREDICTED MODE CHANGE DATA FOR DECOUPLED VERTICAL NAVIGATION (VNAV) AND LATERAL NAVIGATION (LNAV) AUTOPILOT OPERATIONS

TECHNICAL FIELD

Embodiments of the subject matter described herein relate generally to providing Vertical Navigation (VNAV) Autopilot Mode data onboard an aircraft. More particularly, embodiments of the subject matter relate to providing aircraft positions for VNAV Autopilot Mode disengagement during use of a decoupled and disengaged LNAV Autopilot Mode.

BACKGROUND

Automation of flight processes and aircraft onboard equipment increases efficiency and safety during operation of the aircraft. At the same time, such automated systems can complete action items and make changes whether or not flight crew members are actively aware of the action items and/or changes. Situational awareness is critical, such that the flight crew can prepare for upcoming automated changes during the flight, accommodate workload and tasking prioritization, and base operational decisions on such upcoming automated changes. Examples of automated processes may include, without limitation, Lateral Navigation (LNAV) Autopilot Modes and Vertical Navigation (VNAV) Autopilot Modes. The VNAV function aids the flight crew to control to the desired vertical path with the consideration of altitude and speed, and the VNAV function is also responsible for guiding the aircraft when it has diverged from the descent trajectory. Generally, the VNAV commanded trajectories and the modes change autonomously as flight conditions evolve during flight.

A situation requiring a VNAV mode transition during high workload phases of flight (e.g., descent flight phase, approach flight phase) may not be immediately recognizable to flight crew members. Typical aircraft display configurations may present multiple VNAV commands and/or present a combination of VNAV commands with graphical elements and text associated with other systems, processes, or modes. Such display configurations may require close attention to detail, and thus increased pilot workload, to decipher a current VNAV mode and potentially applicable VNAV mode changes.

Accordingly, it is desirable to provide increased situational awareness data (e.g., LNAV and VNAV mode data) during flight. Furthermore, other desirable features and characteristics will become apparent from the subsequent detailed description and the appended claims, taken in conjunction with the accompanying drawings and the foregoing technical field and background.

BRIEF SUMMARY

Some embodiments of the present disclosure provide a method for providing mode data, onboard an aircraft, during operation of a Flight Management System (FMS) using a Vertical Navigation (VNAV) Autopilot Mode. When the FMS has disengaged a Lateral Navigation (LNAV) Autopilot Mode, the method detects a changed aircraft position indicating divergence from a flight path, wherein the changed aircraft position comprises a current aircraft position; calculates a future aircraft position for VNAV Autopilot Mode disengagement, based on the changed aircraft position, a predicted cross-track error, and the divergence from the flight path; and presents the changed aircraft position and the future aircraft position when operating in the VNAV Autopilot Mode, via a display device communicatively coupled to the FMS. Additionally, when the future aircraft position is not on the flight path, the method disengages the VNAV Autopilot Mode of the FMS, based on the changed aircraft position and the future aircraft position for VNAV Autopilot Mode disengagement; calculates a descent path for the aircraft, after disengagement of the VNAV Autopilot Mode; and presents the descent path, via the display device.

Some embodiments of the present disclosure provide a system for providing mode data, onboard an aircraft, during operation of a Flight Management System (FMS) using a Vertical Navigation (VNAV) Autopilot Mode. The system includes a system memory element; the Flight Management System (FMS), configured to: engage and disengage a Lateral Navigation (LNAV) Autopilot Mode during flight; and engage and disengage the VNAV Autopilot Mode during the flight, wherein the LNAV Autopilot Mode and the VNAV Autopilot Mode comprise decoupled modes configured to operate independently; a display device, configured to present an aircraft position during the flight; and at least one processor, communicatively coupled to the system memory element, the FMS, and the display device. When the FMS has disengaged the Lateral Navigation (LNAV) Autopilot Mode, the at least one processor is configured to: detect a changed aircraft position indicating divergence from a flight path, wherein the changed aircraft position comprises a current aircraft position; calculate a future aircraft position for VNAV Autopilot Mode disengagement, based on the changed aircraft position, a predicted cross-track error, and the divergence from the flight path; present the changed aircraft position and the future aircraft position when operating in the VNAV Autopilot Mode, via the display device communicatively coupled to the FMS; when the future aircraft position is not on the flight path, disengage the VNAV Autopilot Mode of the FMS, based on the changed aircraft position and the future aircraft position for VNAV Autopilot Mode disengagement; calculate a descent path for the aircraft, after disengagement of the VNAV Autopilot Mode; and present the descent path, via the display device.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
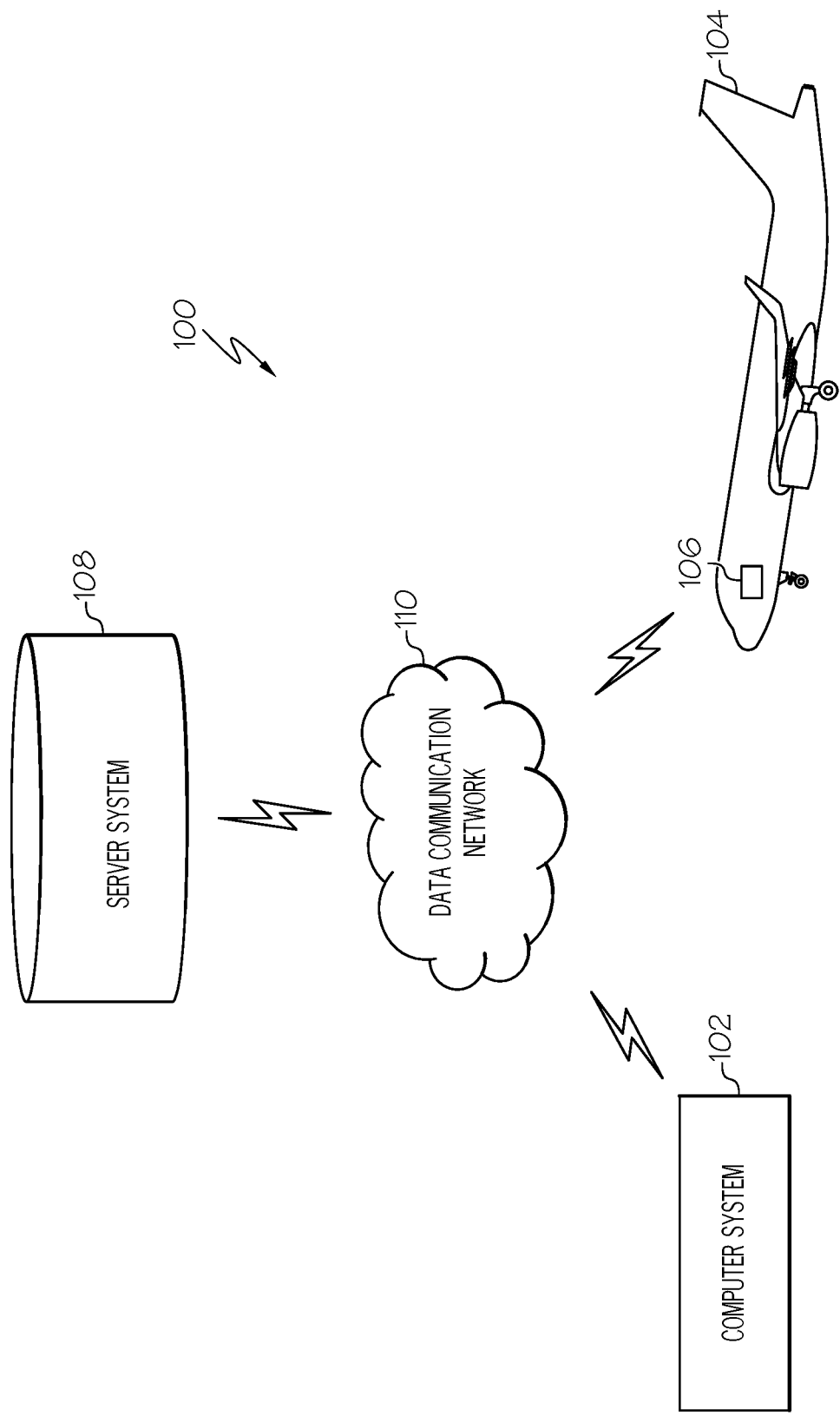
FIG. 1 is a diagram of a system for providing mode data onboard an aircraft, in accordance with the disclosed embodiments.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The subject matter presented herein relates to systems and methods for detecting that the LNAV has been temporarily disengaged in a decoupled system, and maintaining engagement of the VNAV during a short period of time that errors are generally minimal. More specifically, the subject matter relates to determining an appropriate time and/or location for disengagement of the VNAV, when the VNAV can no longer continue operation without significant error. Contemplated herein are techniques for detecting divergence of the aircraft from the flight path, calculating a future position of the aircraft exceeding a divergence threshold, and disengaging the VNAV when the aircraft has exceeded the divergence threshold.

Certain terminologies are used with regard to the various embodiments of the present disclosure. A Flight Management System (FMS) is a specialized computer system that automates various in-flight processes, including in-flight management of the flight plan. The FMS uses a Vertical Navigation (VNAV) Autopilot Mode and a Lateral Navigation (LNAV) Autopilot Mode. The FMS mode is normally termed LNAV for the lateral flight plan and VNAV for the vertical flight plan. The VNAV provides speed and pitch or altitude targets, and the LNAV provides roll steering command to the autopilot. Generally, the VNAV Autopilot Mode and the LNAV Autopilot Mode of an FMS are "coupled", or in other words, functions such that the VNAV and the LNAV are either (i) both engaged (i.e., both VNAV and LNAV are active and operational) or (ii) both disengaged (i.e., both VNAV and LNAV are inactive and not currently operational). Decoupling of the VNAV and LNAV Autopilot Modes permits the VNAV to continue to be engaged, active, and operational when the LNAV is disengaged.

A flight path is the actual or planned course of an aircraft, wherein the aircraft is required to maintain lateral navigation accuracy within a lateral containment area of the flight path. A current aircraft location is an actual position of the aircraft at the present time. A future aircraft position (i.e., a predicted aircraft position) is a potential location of the aircraft at a future time, which is calculated based on the current aircraft location at which the Lateral Navigation (LNAV) Autopilot Mode is disengaged and a current cross-track error. Cross-track error is a current error value associated with lateral navigation accuracy. In other words, the cross-track error is a quantity of deviation from the flight path, based on the current position of the aircraft. A predicted cross-track error is a calculated error value associated with lateral navigation accuracy when the aircraft is located at the future aircraft position. The predicted cross-track error is a quantity of deviation from the flight path, based on the future aircraft position.

Turning now to the figures, FIG. 1 is a diagram of a system 100 for providing mode data onboard an aircraft, in accordance with the disclosed embodiments. The system 100 operates to compute and present a future aircraft position to disengage the Vertical Navigation (VNAV) Autopilot Mode, when the Lateral Navigation (LNAV) Autopilot Mode has already been disengaged, to avoid accumulation of error during the use of the decoupled VNAV. The system 100 may include, without limitation, a computer system 102 that communicates with one or more avionics systems 106 onboard the aircraft 104 and at least one server system 108, via a data communication network 110. In practice, certain embodiments of the system 100 may include additional or alternative elements and components, as desired for the particular application.

The computer system 102 may be implemented by any computing device that includes at least one processor, some form of memory hardware, a user interface, and communication hardware. For example, the computer system 102 may be implemented using a personal computing device, such as a tablet computer, a laptop computer, a personal digital assistant (PDA), a smartphone, or the like. In this scenario, the computer system 102 is capable of storing, maintaining, and executing an Electronic Flight Bag (EFB) application configured to compute a future aircraft position for VNAV disengagement. In other embodiments, the computer system 102 may be implemented using any avionics system or other computing device onboard the aircraft 104, which is configured to compute a future aircraft position for VNAV disengagement. For example, the computer system 102 may be implemented using a Flight Management System (FMS) onboard the aircraft 104.

The aircraft 104 may be any aviation vehicle equipped with a Flight Management System (FMS) using a decoupled VNAV Autopilot Mode and an LNAV Autopilot Mode, and for which computing a future aircraft position for VNAV disengagement is relevant and applicable during completion of a flight plan. The aircraft 104 may be implemented as an airplane, helicopter, spacecraft, hovercraft, or the like. The one or more avionics systems 106 may include a Flight Management System (FMS), navigation devices, aircraft onboard display devices, or the like. Data obtained from the one or more avionics systems 106 may include, without limitation: current flight data, flight path data, navigation data, aircraft performance data, or the like.

The server system 108 may include any number of application servers, and each server may be implemented using any suitable computer. In some embodiments, the server system 108 includes one or more dedicated computers. In some embodiments, the server system 108 includes one or more computers carrying out other functionality in addition to server operations. The server system 108 may store and provide any type of data used to calculate a future aircraft position for VNAV Autopilot Mode disengagement. Such data may include, without limitation: flight plan data, navigation system data, aircraft data, and other data compatible with the computer system 102.

The computer system 102 is usually located onboard the aircraft 104, and the computer system 102 communicates with the one or more avionics systems 106 via wired and/or wireless communication connection. The computer system 102 and the server system 108 are generally disparately located, and the computer system 102 communicates with the server system 108 via the data communication network 110 and/or via communication mechanisms onboard the aircraft 104.

The data communication network 110 may be any digital or other communications network capable of transmitting messages or data between devices, systems, or components. In certain embodiments, the data communication network 110 includes a packet switched network that facilitates packet-based data communication, addressing, and data routing. The packet switched network could be, for example, a wide area network, the Internet, or the like. In various embodiments, the data communication network 110 includes any number of public or private data connections, links or network connections supporting any number of communications protocols. The data communication network 110 may include the Internet, for example, or any other network based upon TCP/IP or other conventional protocols. In various embodiments, the data communication network 110 could also incorporate a wireless and/or wired telephone network, such as a cellular communications network for communicating with mobile phones, personal digital assistants, and/or the like. The data communication network 110 may also incorporate any sort of wireless or wired local and/or personal area networks, such as one or more IEEE 802.3, IEEE 802.16, and/or IEEE 802.11 networks, and/or networks that implement a short range (e.g., Bluetooth) protocol. For the sake of brevity, conventional techniques related to data transmission, signaling, network control, and other functional aspects of the systems (and the individual operating components of the systems) may not be described in detail herein.

Typically, the computer system 102 is implemented as an FMS or a computing device or other avionics system communicatively coupled to the FMS. During typical operation, the computer system 102 detects that the LNAV has been temporarily disengaged in a decoupled system (i.e., a system wherein the LNAV and VNAV are decoupled and may be engaged or disengaged independently), and maintains engagement of the VNAV during a short period of time that errors are generally minimal. The computer system 102 determines an appropriate time and location for disengagement of the VNAV, when the VNAV can no longer continue operation without significant error. The computer system 102 performs this functionality by detecting divergence of the aircraft from the flight path, calculating a future position of the aircraft exceeding a divergence threshold, and disengaging the VNAV when the aircraft has exceeded the divergence threshold. The computer system 102 also presents notifications and/or warnings (via one or more displays onboard the aircraft or a personal computing device) to inform the flight crew of the computed future aircraft position for VNAV Autopilot Mode disengagement.

Figure 2:
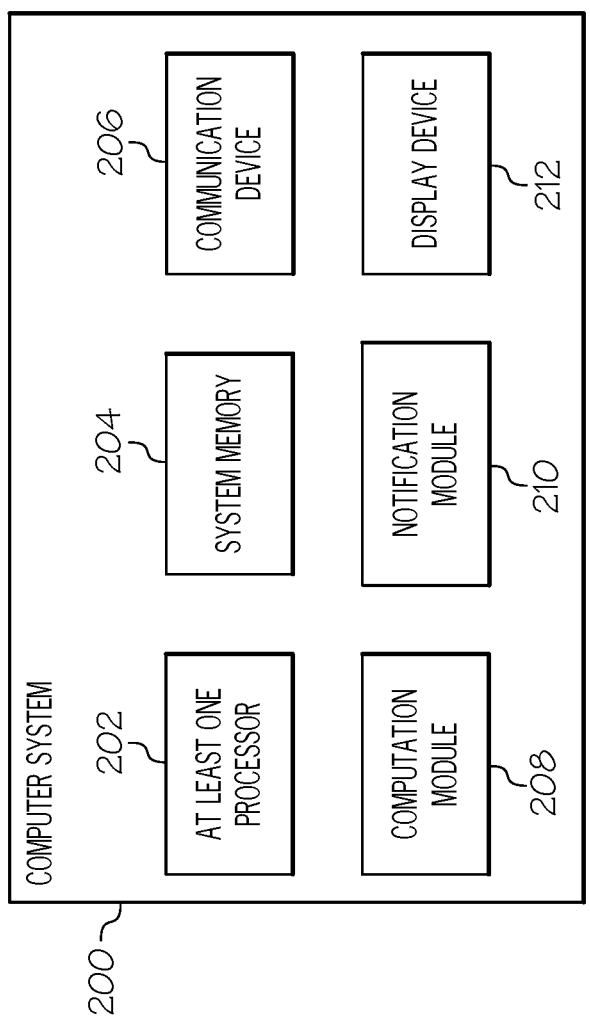
FIG. 2 is a functional block diagram of a computing device, in accordance with the disclosed embodiments.

FIG. 2 is a functional block diagram of a computer system 200, in accordance with the disclosed embodiments. It should be noted that the computer system 200 can be implemented with the computer system 102 depicted in FIG. 1. In this regard, the computer system 200 shows certain elements and components of the computer system 102 in more detail. The computer system 200 generally includes, without limitation: at least one processor 202; a system memory 204 element; a communication device 206; a computation module 208; a notification module 210; and a display device 212. These elements and features of the computer system 200 may be operatively associated with one another, coupled to one another, or otherwise configured to cooperate with one another as needed to support the desired functionality—in particular, compute a future aircraft position for VNAV disengagement and provide notification of such, as described herein. For ease of illustration and clarity, the various physical, electrical, and logical couplings and interconnections for these elements and features are not depicted in FIG. 2. Moreover, it should be appreciated that embodiments of the computer system 200 will include other elements, modules, and features that cooperate to support the desired functionality. For simplicity, FIG. 2 only depicts certain elements that relate to the calculation and presentation of the VNAV Autopilot Mode disengagement techniques, as described in more detail below.

The at least one processor 202 may be implemented or performed with one or more general purpose processors, a content addressable memory, a digital signal processor, an application specific integrated circuit, a field programmable gate array, any suitable programmable logic device, discrete gate or transistor logic, discrete hardware components, or any combination designed to perform the functions described here. In particular, the at least one processor 202 may be realized as one or more microprocessors, controllers, microcontrollers, or state machines. Moreover, the at least one processor 202 may be implemented as a combination of computing devices, e.g., a combination of digital signal processors and microprocessors, a plurality of microprocessors, one or more microprocessors in conjunction with a digital signal processor core, or any other such configuration.

The at least one processor 202 is communicatively coupled to the system memory 204. The system memory 204 is configured to store any obtained or generated data associated with flight plan data, Flight Management System (FMS) data, navigation data, Lateral Navigation (LNAV) Autopilot Mode functionality data, Vertical Navigation (VNAV) Autopilot Mode functionality data, or the like. The system memory 204 may be realized using any number of devices, components, or modules, as appropriate to the embodiment. Moreover, the computer system 200 could include system memory 204 integrated therein and/or a system memory 204 operatively coupled thereto, as appropriate to the particular embodiment. In practice, the system memory 204 could be realized as RAM memory, flash memory, EPROM memory, EEPROM memory, registers, a hard disk, a removable disk, or any other form of storage medium known in the art. In certain embodiments, the system memory 204 includes a hard disk, which may also be used to support functions of the computer system 200. The system memory 204 can be coupled to the at least one processor 202 such that the at least one processor 202 can read information from, and write information to, the system memory 204. In the alternative, the system memory 204 may be integral to the at least one processor 202. As an example, the at least one processor 202 and the system memory 204 may reside in a suitably designed application-specific integrated circuit (ASIC).

The communication device 206 is suitably configured to communicate data between the computer system 200 and (i) one or more remote servers; and/or (ii) one or more avionics systems onboard an aircraft. The communication device 206 may transmit and receive communications over a wireless local area network (WLAN), the Internet, a satellite uplink/downlink, a cellular network, a broadband network, a wide area network, or the like. As described in more detail below, data received by the communication device 206 may include, without limitation: aircraft position data, flight plan data, navigation data, Flight Management System (FMS) data, LNAV Autopilot Mode data, VNAV Autopilot Mode data, and other data compatible with the computer system 200. Data provided by the communication device 206 may include, without limitation, calculated future aircraft position data, time threshold data associated with divergence from the flight path, distance threshold data associated with divergence from the flight path, VNAV Autopilot Mode disengagement data, and the like.

The computation module 208 is configured to perform calculations to identify a location wherein VNAV Autopilot Mode disengagement is necessary to prevent accumulated error that leads to excessive divergence of the aircraft from the current flight plan. The computation module 208 detects LNAV Autopilot Mode disengagement in a decoupled system, determines that a current aircraft position indicates potential divergence from the flight path that exceeds a divergence threshold (e.g., time threshold, distance threshold), and calculates a future aircraft position for VNAV Autopilot Mode disengagement to prevent actual divergence from the flight path that exceeds a divergence threshold.

The notification module 210 is configured to present warnings or notifications in the form of graphical elements and text, to inform the flight crew of a future aircraft position for VNAV Autopilot Mode disengagement. In some embodiments, the notification module 210 presents a notification using a graphical element to indicate the location of VNAV Autopilot Mode disengagement via the display device 212. In some embodiments, the notification module 210 presents graphical elements to indicate the location of VNAV Autopilot Mode disengagement and a second location that the aircraft reaches prior to the location of VNAV Autopilot Mode disengagement, via the display device 212. Additionally, some embodiments of the notification module 210 present a descent path, a current flight path, a revised flight path based on the location of VNAV Autopilot disengagement, a current aircraft position, and any other data relevant to situational awareness and applicable to the particular type of display device 212 used onboard the aircraft.

In practice, the computation module 208 and/or the notification module 210 may be implemented with (or cooperate with) the at least one processor 202 to perform at least some of the functions and operations described in more detail herein. In this regard, the computation module 208 and/or the notification module 210 may be realized as suitably written processing logic, application program code, or the like.

The display device 212 is configured to display various icons, text, and/or graphical elements associated with VNAV Autopilot Mode disengagement, including a future aircraft position for VNAV Autopilot Mode disengagement, a descent profile associated with the future aircraft position, warning messages to notify flight crew members of the future aircraft position for VNAV Autopilot Mode disengagement, or the like. In an exemplary embodiment, the display device 212 is communicatively coupled to the at least one processor 202. The at least one processor 202 and the display device 212 are cooperatively configured to display, render, or otherwise convey one or more graphical representations or images associated with VNAV Autopilot Mode disengagement, and/or warnings thereto, on the display device 212, as described in greater detail below.

In an exemplary embodiment, the display device 212 is realized as an electronic display configured to graphically display an aircraft position for VNAV Autopilot Mode disengagement, as described herein. In some embodiments, the computer system 200 is an integrated computer system onboard an aircraft, and the display device 212 is located within a cockpit of the aircraft, and is thus implemented as an aircraft display. In this example, the display device 212 may be implemented as a Primary Flight Display (PFD), a Vertical Situation Display (VSD), a Multi-Function Display (MFD), a Multi-Function Control and Display Unit (MCDU), or other integrated, aircraft onboard display. In other embodiments, the display device 212 is implemented as a display screen of a standalone, personal computing device (e.g., laptop computer, tablet computer). It will be appreciated that although the display device 212 may be implemented using a single display, certain embodiments may use additional displays (i.e., a plurality of displays) to accomplish the functionality of the display device 112 described herein.

FIGS. 3-6 illustrate four cases wherein a future aircraft position for Vertical Navigation (VNAV) Autopilot Mode disengagement is calculated by a computer system (e.g., a Flight Management System (FMS) or other computer system communicatively coupled to the FMS). In each case, the Lateral Navigation (LNAV) Autopilot Mode has already been disengaged and is currently inactive, and the VNAV can continue operation for a period of time before error accumulates, causing the aircraft to diverge from the flight path in such a way as to exceed a divergence threshold.

Described herein are algorithms to determine the predicted vertical managed mode inactivation (i.e., the VNAV Autopilot Mode) when the managed lateral mode (i.e., the LNAV Autopilot Mode) is inactivated in the various scenarios described with regard to FIGS. 3-6. The four cases illustrate through schematics the operational situations encountered by an aircraft with respect to a curved path. The situations represent change in the vertical managed mode and deactivation of VNAV, which represents change in the vertical managed to manual mode when the lateral mode is disengaged.

Figure 3:
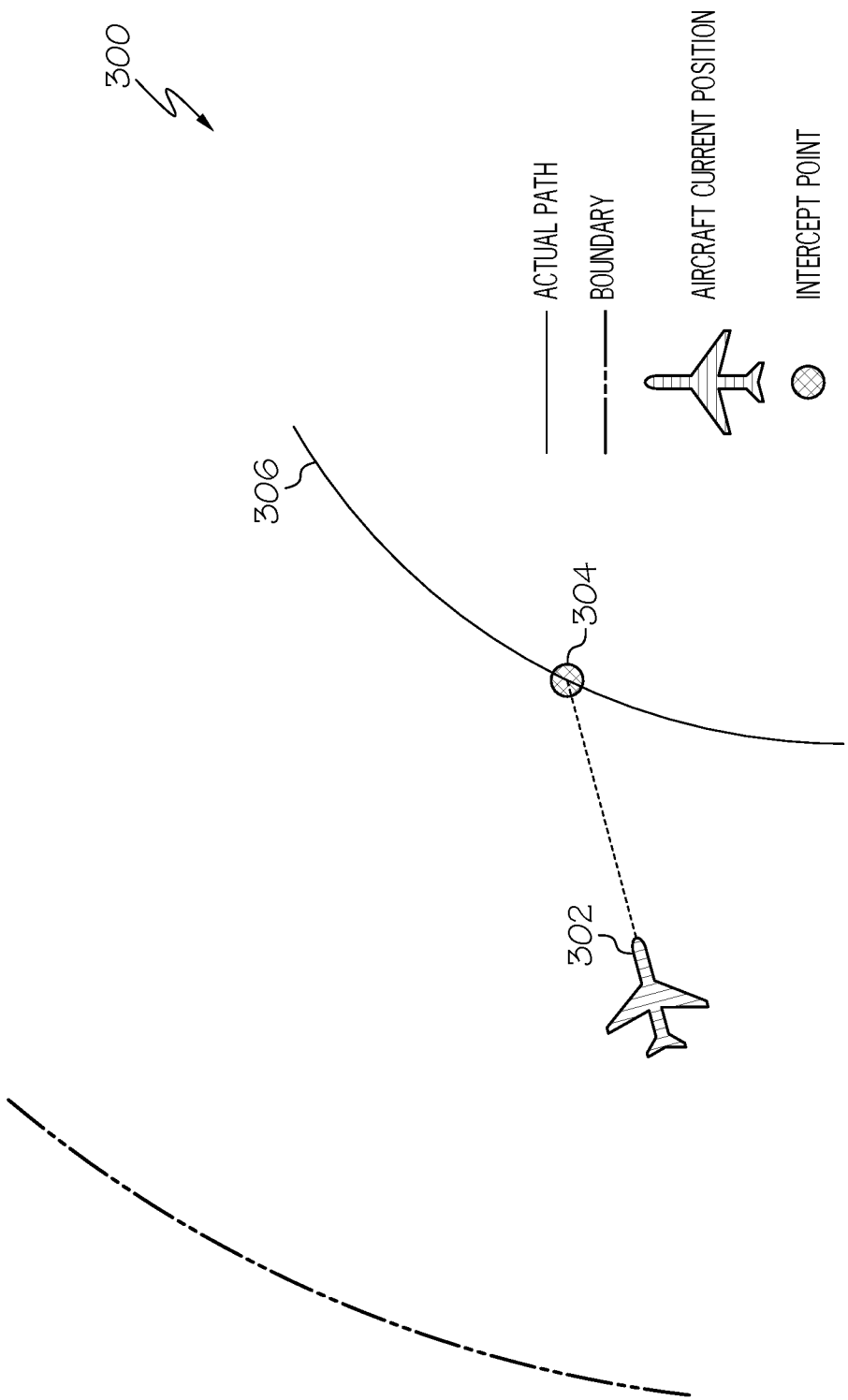
FIG. 3 is a diagram of a predicted aircraft position for a given time when the aircraft is flying wings-level and converging towards the path, in accordance with the disclosed embodiments.

FIG. 3 is a diagram 300 of a predicted aircraft position 304 for a given time when the aircraft 302 is flying wings-level and converging towards a flight path 306, in accordance with the disclosed embodiments. As shown, the aircraft 302 is flying a "level" flight, with no roll, and converging onto the curved flight path 306. The aircraft 302 is approaching and converging towards the reference trajectory, and this is shown when the predicted cross-track error (XTK) and track angle (TKE) is less than zero: XTK. TKE<0. In this scenario, the vertical managed mode remains intact as it is evident that the aircraft 302 is converging towards the intended flight path 306. Because the aircraft 302 is not diverging from the flight path 306 beyond a threshold of allowable divergence, the aircraft 302 continues to use an engaged VNAV Autopilot Mode. Here, there is no calculated applicable point of VNAV Autopilot Mode disengagement due to lack of necessity.

Figure 4:
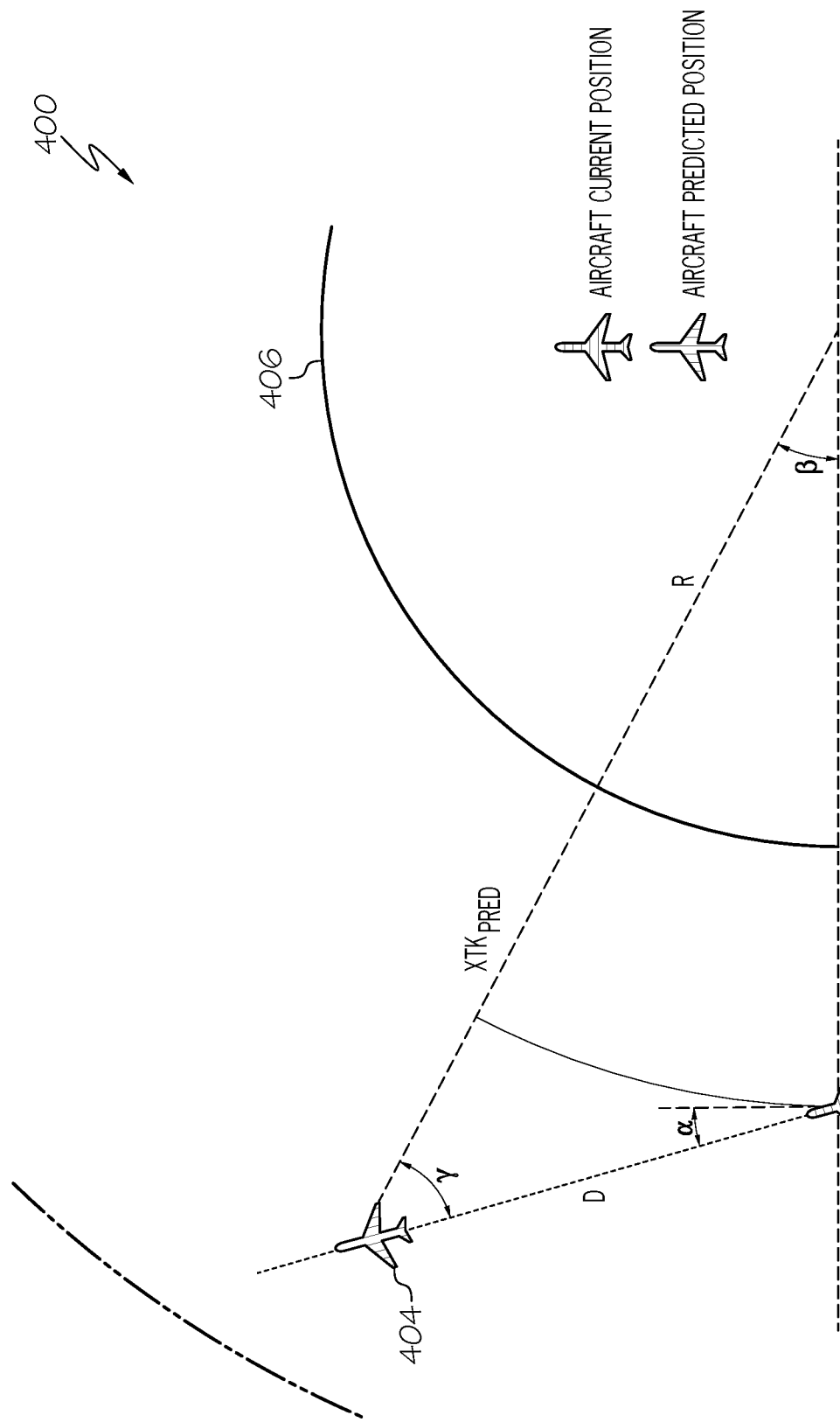
FIG. 4 is a diagram of a predicted aircraft position for a given time when the aircraft is flying a level flight and diverging from the flight path, in accordance with the disclosed embodiments.

FIG. 4 is a diagram 400 of a predicted aircraft position (i.e., a future aircraft position 404) for a given time when the aircraft 402 is flying a level flight and diverging from the flight path, in accordance with the disclosed embodiments. As shown, the aircraft 402 is flying a wings-level flight, with no roll, and diverging off the curved flight path 406. When the aircraft 402 is flying in lateral manual mode during flight on the curved portion of the lateral flight path 406, a distance and location at which the vertical managed mode is disengaged is a computed value. This location is the predicted aircraft position (i.e., the future aircraft position 404) at which the VNAV Autopilot Mode is disengaged. Here, a predicted cross-track error ($XTK_{Pred}$) is computed for a given time-out period (T), and the predicted cross-track error ($XTK_{Pred}$) is then analyzed to determine whether the predicted cross-track error ($XTK_{Pred}$) is within the vertical managed mode dropout corridor. In other words, the predicted cross-track error ($XTK_{Pred}$) indicates that the divergence of the aircraft does not exceed an allowable divergence threshold for the flight path 406. In some embodiments, the vertical managed mode dropout corridor (i.e., the divergence threshold) is a fixed tolerance value. In other embodiments, the divergence threshold is operator modifiable, wherein the user-selected value depends on the need to maintain safe vertical managed mode (i.e., VNAV Autopilot Mode) operations when lateral managed mode (i.e., LNAV Autopilot Mode) is inactivated.

The following algorithms are used to compute the predicted aircraft position (i.e., the future aircraft position 404) for a given time when the aircraft 402 is flying a level flight. As shown in FIG. 4, the predicted cross-track error ($XTK_{Pred}$) and β are unknown parameters, and D is the predicted distance travelled from the point at which the LNAV Autopilot Mode is dropped to the point reached for the time T for a given ground speed. XTK is the current cross-track error computed at the time LNAV was disengaged, and R represents the turn radius of the curved path transition. From the above specified geometrical example, the remaining unknown parameters are computed as follows:

$$\frac{D}{\sin\beta} = \frac{XTKPred + R}{\sin(\alpha + 90°)} = \frac{XTK + R}{\sin\gamma} \quad (1)$$

$$\alpha + \beta + \gamma + 90° = 180°$$

$$\gamma = 90° - (\alpha + \beta)$$

$$\sin\gamma = \cos(\alpha + \beta) \quad (2)$$

$$\frac{D}{\sin\beta} = \frac{XTK + R}{\cos(\alpha + \beta)}$$

$$\frac{D}{\sin\beta}[\cos\alpha\cos\beta - \sin\alpha\sin\beta] = XTK + R$$

$$\frac{\cos\alpha}{\tan\beta} - \sin\alpha = \frac{XTR + R}{D}$$

$$\cos\alpha\cot\beta = \frac{XTK + R}{D} + \sin\alpha \quad (3)$$

$$\cot\beta = \frac{XTK + R}{D\cos\alpha} + \tan\alpha$$

$$\beta = \cot^{-1}\frac{XTKPred + R}{D\cos\alpha} + \tan\alpha$$

$$\frac{D}{\sin\beta} = \frac{XTKPred + R}{\sin(\alpha + 90°)}$$

Thus, the predicted cross-track error for the time T, and for a given ground speed for the level flight, is computed as follows:

$$XTK_{Pred} = \frac{D}{\sin\beta}\sin(\alpha + 90°) - R \quad (4)$$

The algorithm includes detecting a current action of the aircraft 402, wherein the current action includes the aircraft 402 diverging away from the flight path 406 by flying wings-level away from a curved path, wherein the flight path 406 comprises the curved path; identifying parameters based on the current action, the parameters comprising at least a current aircraft position, the threshold time period, a predicted distance travelled from a point of LNAV disengagement, an ground speed of the aircraft 402, a current cross-track error (XTK) computed at a time of LNAV disengagement, and a turn radius of a transition from the curved path; and computing a predicted cross-track error ($XTK_{Pred}$) for a predicted aircraft position (i.e., the future aircraft position 404), using the parameters, wherein the future aircraft position comprises the predicted aircraft position (i.e., the future aircraft position 404).

The predicted cross-track error ($XTK_{Pred}$) indicates divergence of the aircraft 402 that is greater than, or less than, a divergence threshold for the computed future aircraft position 404. When the predicted cross-track error ($XTK_{Pred}$) indicates divergence that is greater than the divergence threshold, then the VNAV Autopilot Mode is disengaged at the future aircraft position 404.

Figure 5:
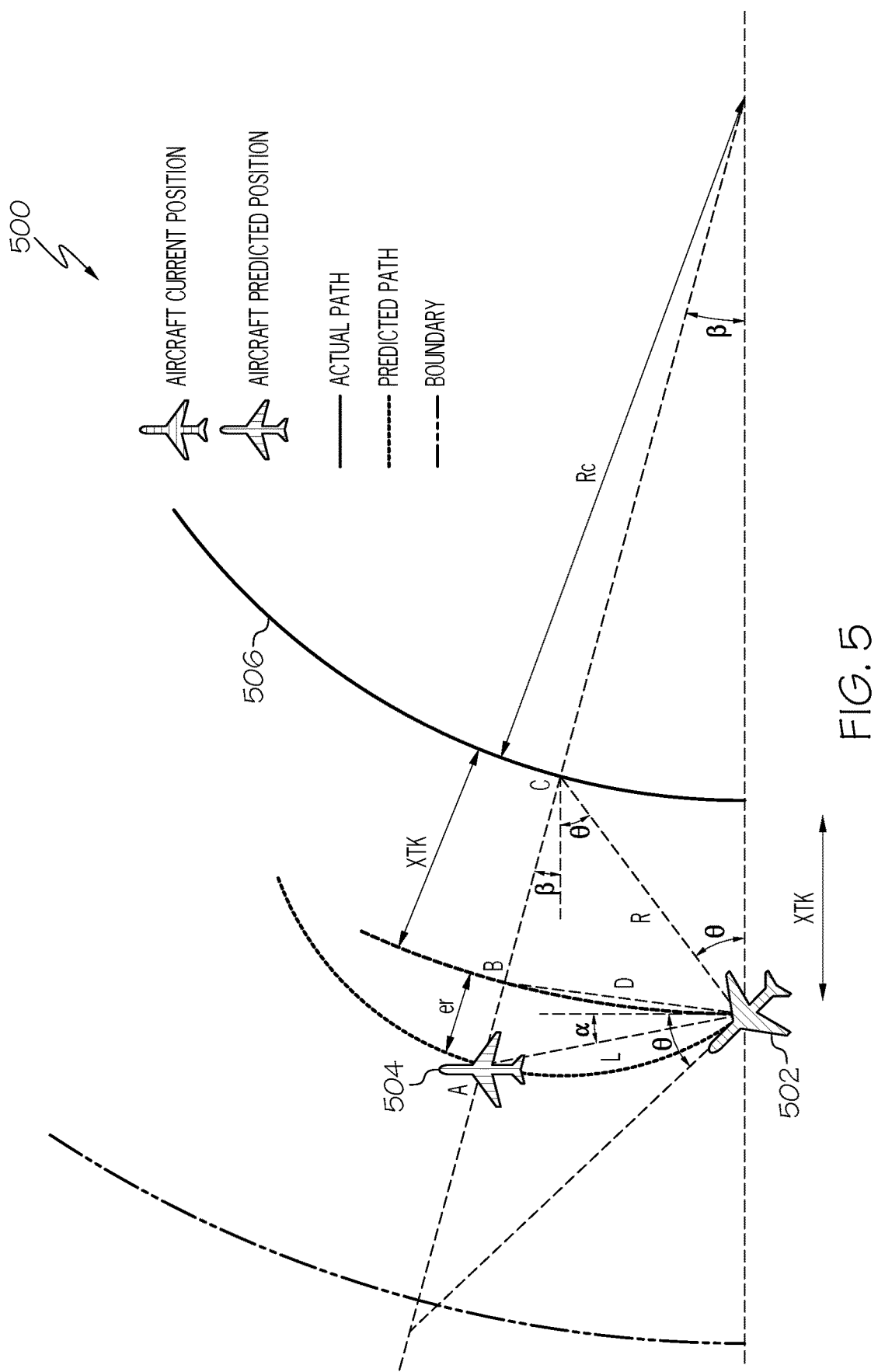
FIG. 5 is a diagram of a predicted aircraft position for a given time when the aircraft is banking to attain the target course or heading, in accordance with the disclosed embodiments.

FIG. 5 is a diagram 500 of a predicted aircraft position 504 (i.e., calculated future aircraft position) for a given time when the aircraft 502 is banking to attain the target course or heading, in accordance with the disclosed embodiments.

As shown, the aircraft 502 is converging onto the curved path (i.e., the flight path 506) using a specific bank angle to achieve the target course or heading. When the aircraft 502 is flying in lateral manual mode during flight on the curved portion while banking to attain the target course or heading of the lateral flight plan, a distance value, ending at a location (i.e., future aircraft position) at which inactivation of the vertical managed mode is a computed value. This location is the predicted aircraft position 504 at which the VNAV Autopilot Mode is disengaged. Here, a predicted cross-track error ($XTK_{Pred}$) is computed for a given time-out period (T), and the predicted cross-track error ($XTK_{Pred}$) is then analyzed to determine whether the predicted cross-track error ($XTK_{Pred}$) is within the vertical managed mode drop-out corridor. In other words, the predicted cross-track error ($XTK_{Pred}$) indicates that the divergence of the aircraft 502 does not exceed an allowable divergence threshold for the flight path 506.

The following algorithms are used to compute the predicted aircraft position 504 for a given time when the aircraft 502 is converging onto the curved path (i.e., the flight path 506) using a specific bank angle to achieve the target course or heading. As shown in FIG. 5, the predicted cross-track error ($XTK_{Pred}$) at time T is $e_r$+XTK, wherein $e_r$ is an unknown parameter, and XTK is the current cross-track error computed at the time the LNAV was disengaged. L is the predicted distance travelled from the point lateral managed mode (i.e., LNAV Autopilot Mode) is dropped to the point reached for the time T for a given ground speed of the aircraft 502.

$R_c$ is the turn radius of the constructed path, and R is the computed turn radius to attain the given bank angle ($\Phi$). From the above specified geometrical example, the remaining unknown parameters are computed as follows:

$$R = \frac{V^2}{G} * \tan\Phi$$

where: V=the velocity of the aircraft 502 in knots,
G=the acceleration of gravity in knots per hour, and
$\Phi$=the roll angle of the aircraft 502 during the turn.

Unknown parameters include: $\alpha$, $\beta$, $e_r$. The following algorithms are used to calculate the predicted cross-track error ($XTK_{Pred}$):

To determine $\beta$:

$$\frac{R}{\sin\beta} = \frac{Rc}{\sin\theta} \quad (1)$$

$$\beta = \sin^{-1}\left(\frac{R}{Rc}\sin\theta\right)$$

To determine $\alpha$ (wherein L is the chord of the arc included between AC and PC as shown in FIG. 5):

$$L = 2R\sin\left(\frac{\beta+\theta}{2}\right)$$

$$\angle BPC = 90 - \left(\theta + \frac{\beta}{2}\right)$$

$$\angle PBC = 90 - \frac{\beta}{2}$$

$$\angle PBA = 90 + \frac{\beta}{2}$$

$$\angle PAB = 90 - (\alpha + \beta)$$

$$\sin(90 - (\alpha + \beta)) = \cos(\alpha + \beta)$$

From the rule of sine ($\Delta APB$), $$\frac{D}{\sin(90-(\alpha+\beta))} = \frac{er}{\sin\left(\alpha+\frac{\beta}{2}\right)} = \frac{L}{\sin\left(90+\frac{\beta}{2}\right)}$$

$$\frac{D}{\cos(\alpha+\beta)} = \frac{L}{\sin\frac{\beta}{2}}$$

The parameter $\alpha$ is determined as follows:

$$\alpha = \cos^{-1}\left(\frac{D}{L}\sin\frac{\beta}{2}\right) - \beta \quad (2)$$

Thus, $e_r$ is computed as follows:

$$er = \frac{L}{\sin\frac{\beta}{2}}\sin\left(\alpha+\frac{\beta}{2}\right) \quad (3)$$

Thus, the $XTK_{Pred}=e_r$+XTK, which is the predicted cross-track error for a given ground speed at time T. When $XTK_{Pred}$ is less than the maximum threshold distance, then vertical managed mode (i.e., VNAV Autopilot Mode) remains engaged and active. However, when $XTK_{Pred}$ exceeds the maximum threshold distance, then the vertical managed mode is inactivated (i.e., the VNAV Autopilot Mode is disengaged).

The algorithms for calculating a future aircraft position for disengagement of the VNAV Autopilot Mode include detecting a current action of the aircraft 502, wherein the current action includes the aircraft 502 converging toward the flight path 506 by flying in lateral manual mode and using a particular bank angle to attain a target course or heading of a lateral flight plan, wherein the flight path 506 comprises the lateral flight plan; identifying parameters based on the current action, the parameters comprising at least a current aircraft position, the threshold time period, a predicted distance travelled from a point of LNAV disengagement, an ground speed of the aircraft 502, and a current cross-track error computed at a time of LNAV disengagement; and computing a predicted cross-track error for a predicted aircraft position 504, using the parameters, wherein the future aircraft position comprises the predicted aircraft position 504.

Figure 6:
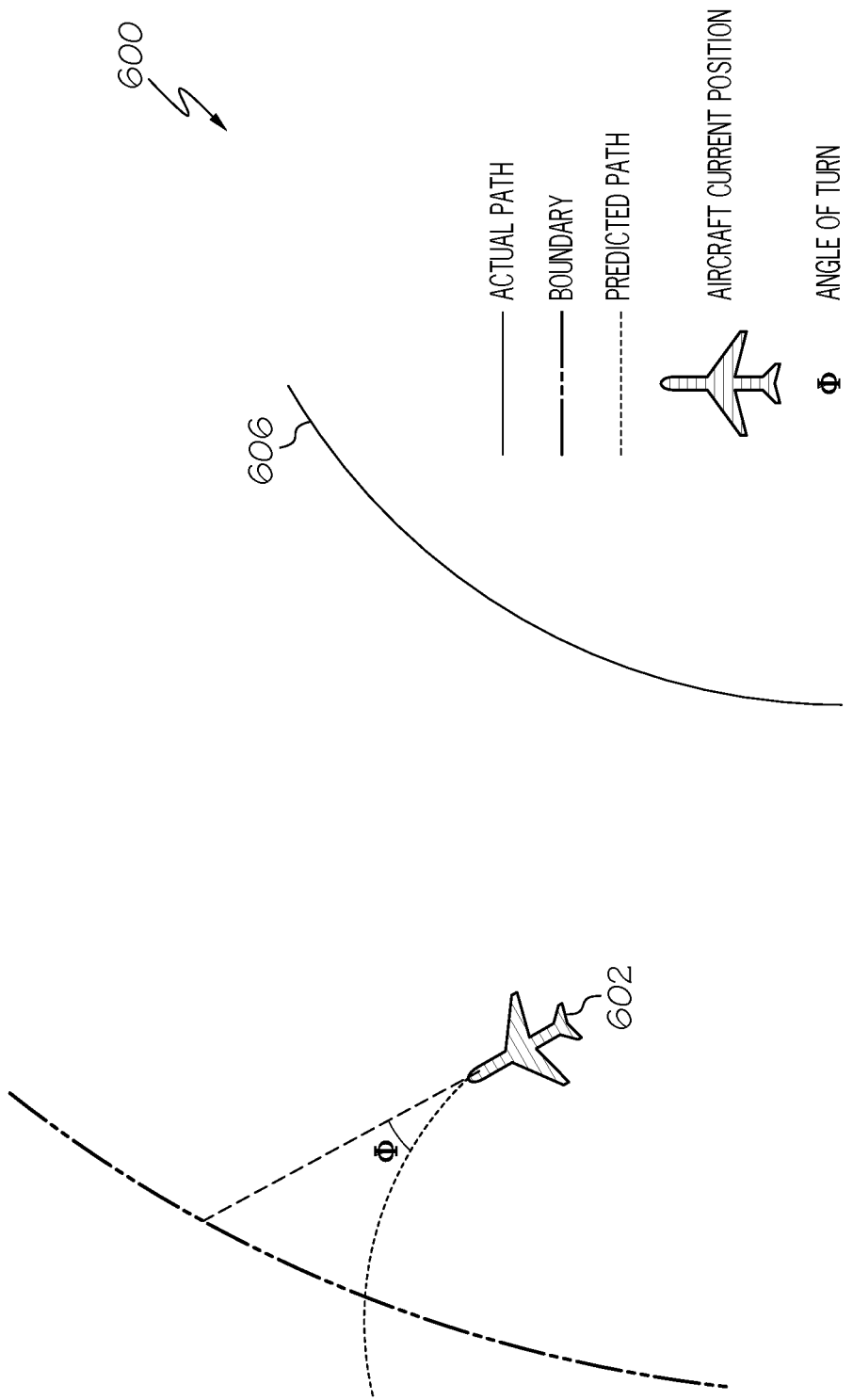
FIG. 6 is a diagram of a predicted aircraft position for a given time when the aircraft is banking away from the current flight path, in accordance with the disclosed embodiments.

FIG. 6 is a diagram 600 of a predicted aircraft position for a given time when the aircraft 602 is banking away from the current flight path 606, in accordance with the disclosed embodiments. As shown, the aircraft 602 is diverging off the curved path using a specific bank angle. In the diagram 600 shown in FIG. 6, the aircraft 602 is diverging from the flight path 606 using a turn angle ($|\Phi|$). Here, the turn angle ($|\Phi|$) is greater than one degree: ($|\Phi|$>1 degree), causing increased divergence as |TKE| increases. Increased divergence indicates that maintaining an engaged and active vertical managed mode results in the additional accumulation of error in the absence of an active managed lateral mode. The vertical managed mode is disengaged immediately to prevent the increased accumulation of error.

Computation of a predicted aircraft position for a given time when the aircraft 602 is banking away from the flight path 606 includes detecting a current action of the aircraft 602, wherein the current action includes the aircraft 602 diverging away from the flight path 606 by flying away from a curved path and using a particular bank angle, wherein the flight path 606 comprises the curved path; determining that the future aircraft position is associated with accumulated error, based on the current action; and disengaging the VNAV Autopilot Mode, based on the future aircraft position being associated with accumulated error.

FIGS. 7-12 illustrate embodiments for presenting warnings, messages, visual indications, and notifications onboard the aircraft, to notify the flight crew of an upcoming location of Vertical Navigation (VNAV) Autopilot Mode disengagement, under conditions wherein the Lateral Navigation (LNAV) Autopilot Mode is currently disengaged and inactive. Such notifications may be presented via aircraft onboard displays, including but not limited to: a Primary Flight Display (PFD), a Multi-Function Display (MFD), a Multi-Function Control and Display Unit (MCDU), a Vertical Situation Display (VSD), or the like. Based on the position of the aircraft at inactivation of lateral managed mode (i.e., disengagement of the LNAV Autopilot Mode), and logic to predict the inactivation of managed vertical mode (i.e., predicted point of disengagement of the VNAV Autopilot Mode), FIGS. 7-12 are representations of the methods to provide appropriate cockpit warnings and exemplary embodiments of the warnings.

Figure 7:
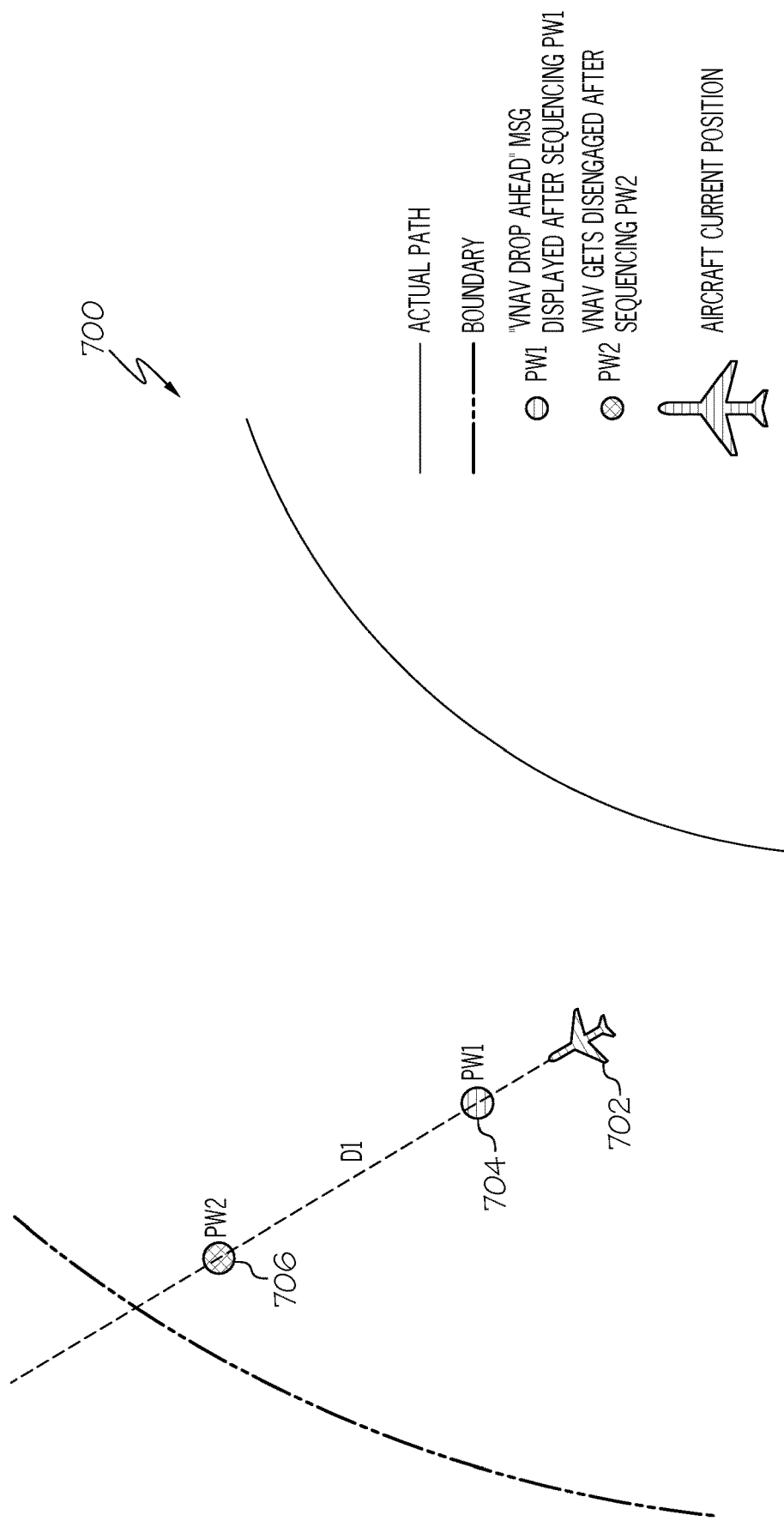
FIG. 7 is a diagram of a presentation of indications of (i) an aircraft position for Vertical Navigation (VNAV) Autopilot Mode disengagement, and (ii) an aircraft position at which notifications of VNAV Autopilot Mode disengagement occurs, in accordance with the disclosed embodiments.

FIG. 7 is a diagram 700 of a presentation of indications of (i) an aircraft position for Vertical Navigation (VNAV) Autopilot Mode disengagement, and (ii) an aircraft position at which notifications of VNAV Autopilot Mode disengagement occurs, in accordance with the disclosed embodiments. The diagram 700 includes two location points: a first location point 704 and a second location point 706. The second location point 706 indicates a location for disengagement of the VNAV Autopilot Mode. The first location point 704 indicates a location for the presentation of warnings, alerts, messages, or any type of notification of an upcoming disengagement or inactivation of the VNAV Autopilot Mode. In this scenario, the first location point 704 and the second location point 706 are located ahead of the aircraft 702. During flight, the aircraft 702 encounters the first location point 704 as the first point in a sequence that includes, in order: (1) the first location point 704, and (2) the second location point 706.

In exemplary embodiments of the notification system shown, the first location point 704 indicates time and location for presentation of a text message "VNAV DROP AHEAD", which is displayed via an MCDU, MFD, and/or PFD onboard the aircraft 702. The first location point 704 is determined based on the calculated location of the future aircraft position at which the vertical managed mode is disengaged or inactivated, wherein the calculated location occurs ahead of the first location point 704. Using a Vertical Situation Display (VSD), the first location point 704 is marked or indicated with an arrow. The second location point 706 indicates the location at which the vertical managed mode is disengaged. Using a VSD, the second location point 706 is marked or indicated with an 'X' marker, and the following descent path is indicated using a hashed line.

Figure 8:
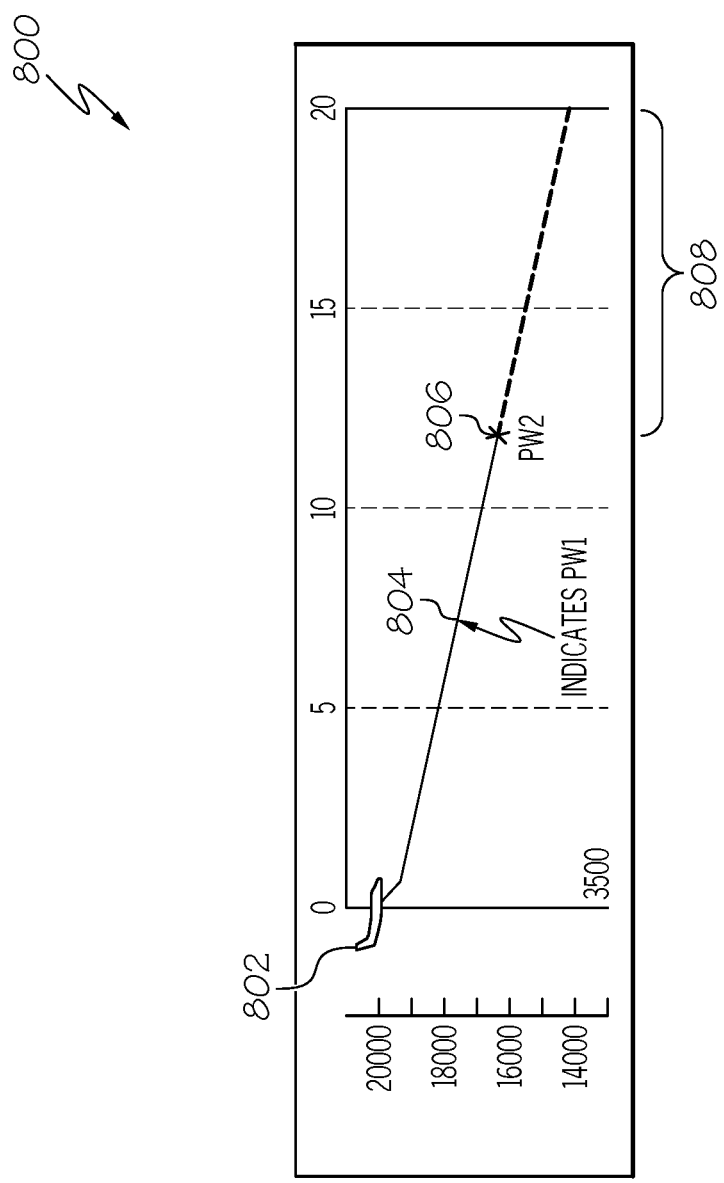
FIG. 8 is a diagram of a Vertical Situation Display (VSD) 800 presenting indications of (i) an aircraft position for Vertical Navigation (VNAV) Autopilot Mode disengagement, and (ii) an aircraft position at which notifications of VNAV Autopilot Mode disengagement occurs, in accordance with the disclosed embodiments.

An exemplary embodiment the diagram of FIG. 7 presented via a particular aircraft onboard display is shown in FIG. 8. FIG. 8 is a diagram of a Vertical Situation Display (VSD) 800 presenting indications of (i) an aircraft position for Vertical Navigation (VNAV) Autopilot Mode disengagement, and (ii) an aircraft position at which notifications of VNAV Autopilot Mode disengagement occurs, in accordance with the disclosed embodiments. It should be appreciated that FIG. 8 depicts a simplified embodiment of a graphical interface presented by the VSD 800, and that some implementations of the VSD 800 may include additional elements or components.

On the VSD 800, the aircraft 802 is shown traveling from left to right across the display. During flight, the aircraft 802 encounters the first location point 804 as the first point in a sequence that includes: (1) the first location point 804, (2) the second location point 806, and (3) the descent 808. As shown, the VSD 800 presents the first location point 804 using a first color, the second location point 806 using a second color, and the descent 808 using a dashed line in a third color. It should be appreciated that other embodiments may present each of the first location point 804, the second location point 806, and the descent 808 using any graphical elements that include visually distinguishable characteristics. The graphical interface, presented by the VSD 800, provides a visually intuitive summary of the current location of the aircraft 802, the location for disengagement of the VNAV Autopilot Mode, and the location for presenting warnings and notifications associated with disengaging the VNAV Autopilot Mode.

Figure 9:
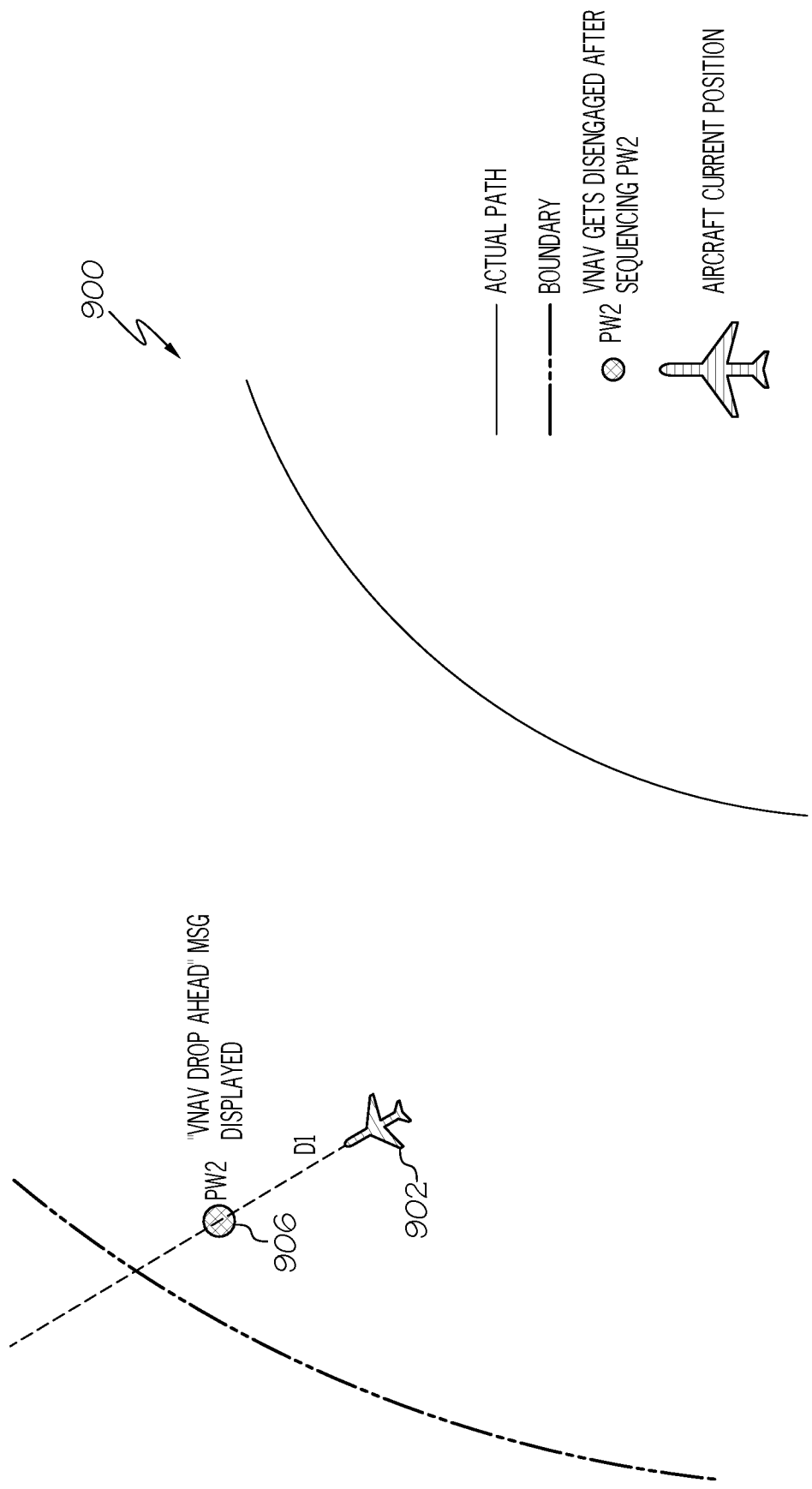
FIG. 9 is a diagram of another presentation of indications of (i) an aircraft position for Vertical Navigation (VNAV) Autopilot Mode disengagement, and (ii) an aircraft position at which notifications of VNAV Autopilot Mode disengagement occurs, in accordance with the disclosed embodiments.

FIG. 9 is a diagram 900 of another presentation of an indication of an aircraft position for Vertical Navigation (VNAV) Autopilot Mode disengagement, in accordance with the disclosed embodiments. The diagram 900 includes one location point: a VNAV disengagement location point 906 indicating a location for disengagement of the VNAV Autopilot Mode of the Flight Management System (FMS). The diagram 900 does not show a notification location point indicating a location for the presentation of warnings, alerts, messages, or any type of notification of an upcoming disengagement or inactivation of the VNAV Autopilot Mode. During flight, the aircraft 902 has already encountered the notification location point, and will encounter the upcoming VNAV disengagement location point 906 as the second location point in a sequence that includes, in order: (1) the notification location point, and (2) the VNAV disengagement location point 906. In this scenario, the VNAV disengagement location point 906 is located ahead of the aircraft 902, and the notification location point (not shown) is located behind the aircraft 902. The aircraft 902 has already encountered the notification location point, and warnings or alerts associated with the upcoming VNAV disengagement (at the VNAV disengagement location point 906) were presented at the notification location point. The warnings, messages, or notifications are generally presented via at least one aircraft onboard display device, which may include a Multi-Function Control and Display Unit (MCDU), a Multi-Function Display (MFD), a Primary Flight Display (PFD), and/or a Vertical Situation Display (VSD).

Figure 10:
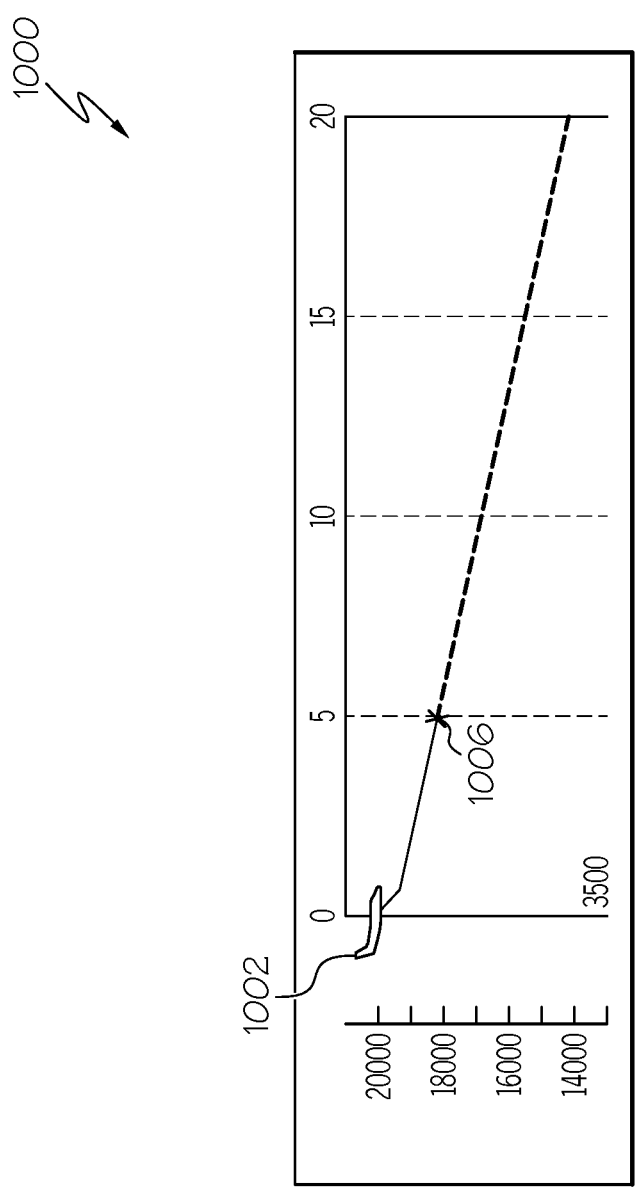
FIG. 10 is a diagram of a VSD presenting the notification or warning indicating VNAV Autopilot Mode disengagement, in accordance with the disclosed embodiments.

One exemplary embodiment the diagram of FIG. 9 presented via a particular aircraft onboard display is shown in FIG. 10. FIG. 10 is a diagram of a VSD 1000 presenting the notification or warning indicating VNAV Autopilot Mode disengagement, in accordance with the disclosed embodiments. It should be appreciated that FIG. 10 depicts a simplified embodiment of a graphical interface presented by the VSD 1000, and that some implementations of the VSD 1000 may include additional elements or components.

On the VSD 1000, the aircraft 1002 is shown traveling from left to right across the display. During flight, the aircraft 1002 encounters the VNAV disengagement location point 1006 as the second location point in a sequence that includes: (1) the notification location point, (2) the VNAV disengagement location point 1006, and (3) the descent 1008. The notification location point has already been passed by the aircraft 1002, the notification location point is thus behind the aircraft 1002 during flight, and the notification location point is not shown by the VSD 1000. As shown, the VSD 1000 presents the VNAV disengagement location point 1006 using a first color, and the descent 1008 using a dashed line in a second color. It should be appreciated that other embodiments may present each of the VNAV disengagement location point 1006, and the descent 1008 using any graphical elements that include visually distinguishable characteristics. The graphical interface, presented by the VSD 1000, provides a visually intuitive summary of the current location of the aircraft 1002, the location for disengagement of the VNAV Autopilot Mode, and the location for presenting warnings and notifications associated with disengaging the VNAV Autopilot Mode.

Figure 11:
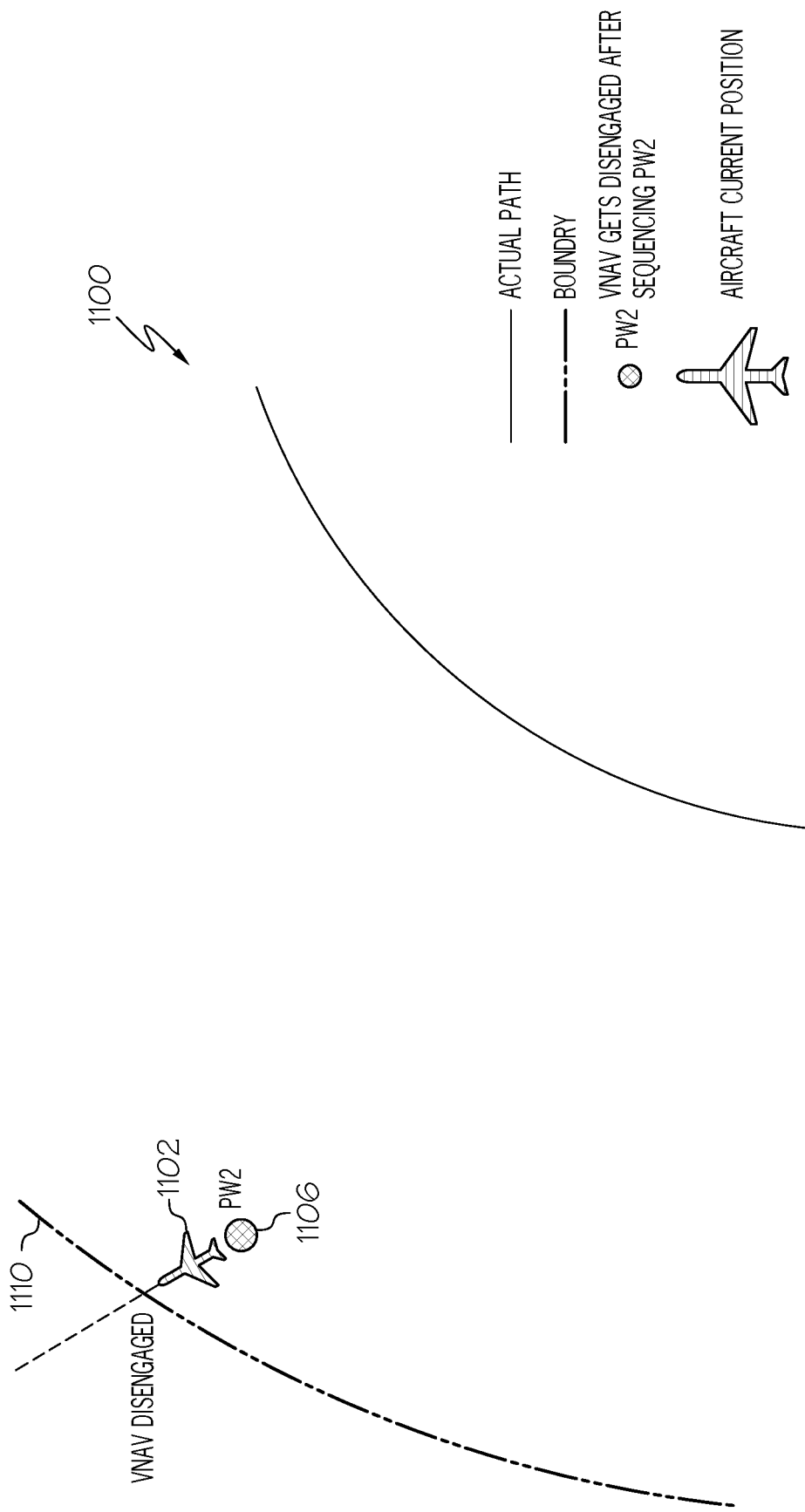
FIG. 11 is a diagram of an aircraft position at which VNAV Autopilot Mode is disengaged, in accordance with the disclosed embodiments.

FIG. 11 is a diagram 1100 of an aircraft position at which VNAV Autopilot Mode is disengaged, in accordance with the disclosed embodiments. The diagram 1100 includes one location point: a VNAV disengagement location point 1106 indicating a location for disengagement of the VNAV Autopilot Mode of the Flight Management System (FMS). As shown, the VNAV disengagement location point 1106 is behind the aircraft 1102 as the aircraft 1102 travels toward a divergence threshold boundary 1110. The diagram 1100 does not show a notification location point indicating a location for the presentation of warnings, alerts, messages, and notifications associated with the already-passed disengagement or inactivation of the VNAV Autopilot Mode. During flight, the aircraft 1102 has already encountered the notification location point, and has already encountered the VNAV disengagement location point 1106 as the second location point in a sequence that includes, in order: (1) the notification location point, and (2) the VNAV disengagement location point 1106. In this scenario, the VNAV disengagement location point 1106 is located behind the aircraft 1102, and the notification location point (not shown) is also located behind the aircraft 1102. The aircraft 1102 has already encountered the notification location point, and warnings or alerts associated with the upcoming VNAV disengagement (at the VNAV disengagement location point 1106) were presented at the notification location point. The warnings, messages, or notifications are generally presented via at least one aircraft onboard display device, which may include a Multi-Function Control and Display Unit (MCDU), a Multi-Function Display (MFD), a Primary Flight Display (PFD), and/or a Vertical Situation Display (VSD). The aircraft 1102 has also already encountered the VNAV disengagement location point 1106 and, as a result, the VNAV Autopilot Mode of the Flight Management System (FMS) onboard the aircraft 1102 has been disengaged or inactivated.

Figure 12:
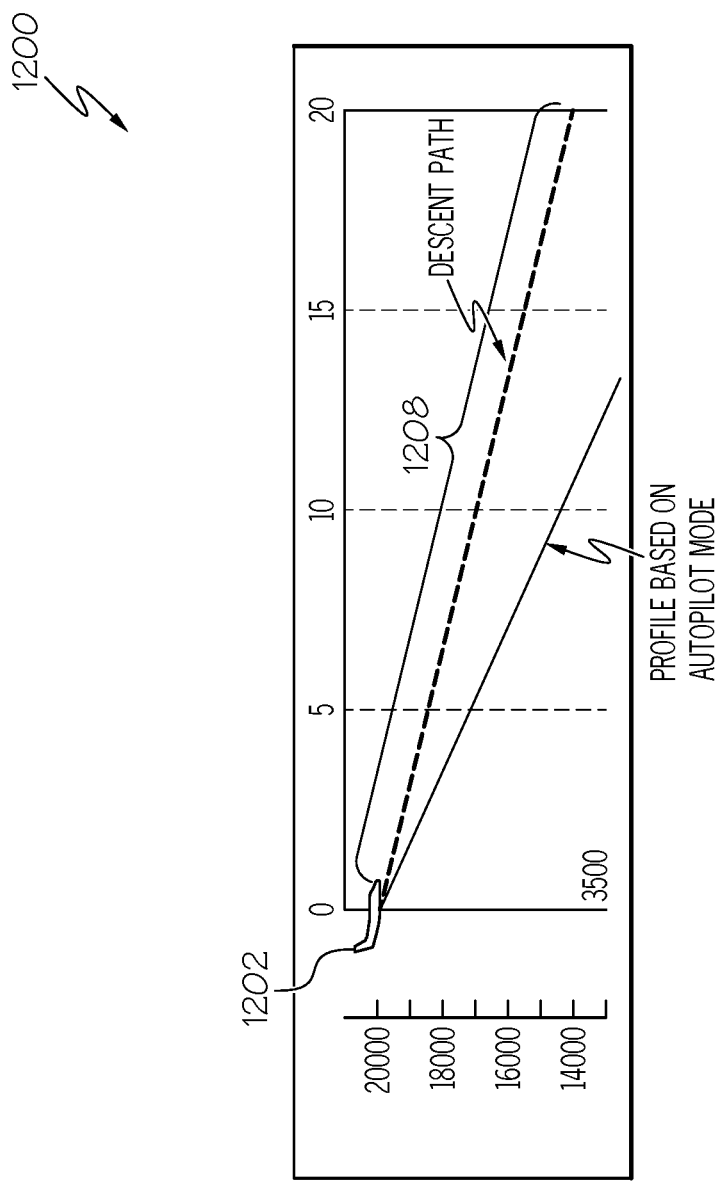
FIG. 12 is a diagram of a VSD presenting a descent path associated with the aircraft position at which VNAV Autopilot Mode is disengaged, in accordance with the disclosed embodiments.

One exemplary embodiment the diagram of FIG. 11 presented via a particular aircraft onboard display is shown in FIG. 12. FIG. 12 is a diagram of a Vertical Situation Display (VSD) 1200 presenting a descent path 1208 associated with the aircraft position at which VNAV Autopilot Mode is disengaged, in accordance with the disclosed embodiments. It should be appreciated that FIG. 12 depicts a simplified embodiment of a graphical interface presented by the VSD 1200, and that some implementations of the VSD 1200 may include additional elements or components.

On the VSD 1200, the aircraft 1202 is shown traveling from left to right across the display. During flight, the aircraft 1202 has already encountered a notification location point and a VNAV disengagement location point, in a sequence that includes: (1) the notification location point, (2) the VNAV disengagement location point, and (3) the descent path 1208. The notification location point has already been passed by the aircraft 1202, the notification location point is thus behind the aircraft 1202 during flight, and the notification location point is not shown by the VSD 1200. Similarly, the VNAV disengagement location point has already been passed by the aircraft 1202, the VNAV disengagement location point is thus behind the aircraft 1202 during flight, and the VNAV disengagement location point is not shown by the VSD 1200. As shown, the aircraft 1202 is currently located at the beginning of the descent path 1208, which is presented as a dashed line. The graphical interface, presented by the VSD 1200, provides a visually intuitive summary of the current location of the aircraft 1202, the location for the descent path 1208, the location for disengagement of the VNAV Autopilot Mode, and the location for presenting warnings and notifications associated with disengaging the VNAV Autopilot Mode.

Figure 13:
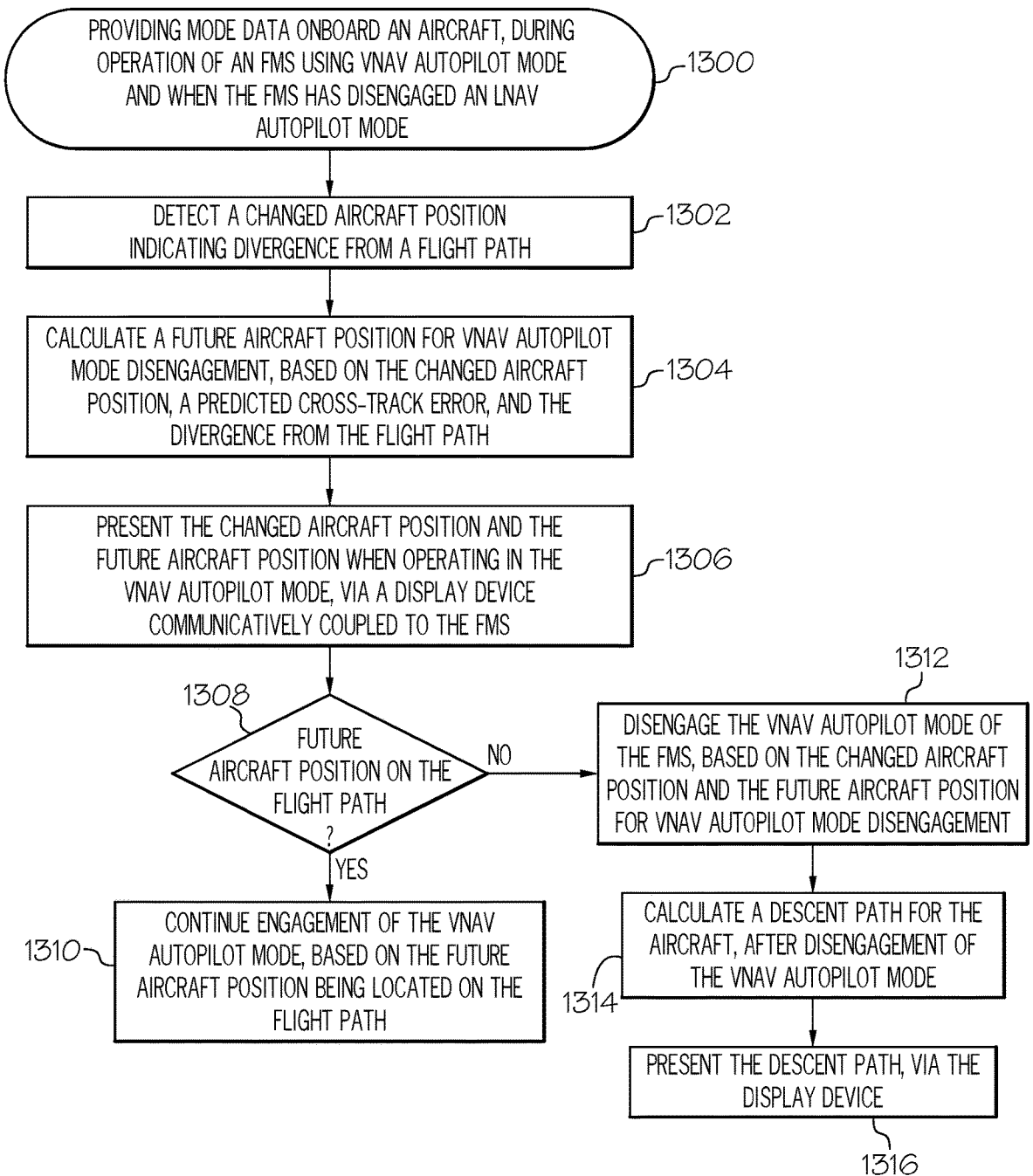
FIG. 13 is a flow chart that illustrates an embodiment of a process for providing mode data onboard an aircraft, during operation of a Flight Management System (FMS) using VNAV Autopilot Mode and when the FMS has disengaged a Lateral Navigation (LNAV) Autopilot Mode, in accordance with the disclosed embodiments.

FIG. 13 is a flow chart that illustrates an embodiment of a process 1300 for providing mode data onboard an aircraft, during operation of a Flight Management System (FMS) using VNAV Autopilot Mode and when the FMS has disengaged a Lateral Navigation (LNAV) Autopilot Mode, in accordance with the disclosed embodiments. First, the process 1300 detects a changed aircraft position indicating divergence from a flight path (step 1302). One suitable methodology for detecting a changed aircraft position indicating divergence from a flight path is described below with reference to FIG. 14. Divergence from the flight path is calculated based on an allowable divergence threshold. The process 1300 determines that the aircraft has deviated from the flight path, and that the extent of the deviation exceeds an allowable quantity, wherein the allowable quantity is less than the divergence threshold. Here, the process 1300 detects that the aircraft is located at the changed aircraft position, wherein the changed aircraft position exceeds the divergence threshold. In other words, the process 1300 detects that the deviation of the aircraft is larger than the allowable quantity of divergence.

Next, the process 1300 calculates a future aircraft position for VNAV Autopilot Mode disengagement, based on the changed aircraft position, a predicted cross-track error, and the divergence from the flight plan (step 1304). Suitable methodologies for calculating a future aircraft position for VNAV Autopilot Mode disengagement are described below with reference to FIGS. 15-16. The future aircraft position (i.e., a predicted aircraft position) is a potential location of the aircraft at a future time, which is calculated based on the current aircraft location at which the Lateral Navigation (LNAV) Autopilot Mode is disengaged and a current cross-track error. Cross-track error (i.e., current cross-track error) is a current error value associated with lateral navigation accuracy. In other words, the cross-track error is a quantity of deviation from the flight path, based on the current position of the aircraft. A predicted cross-track error is a calculated error value associated with lateral navigation accuracy when the aircraft is located at the future aircraft position. The predicted cross-track error is a quantity of deviation from the flight path, based on the future aircraft position. Here, the process 1300 uses the current aircraft location and current cross-track error to calculate a predicted cross-track error and a future aircraft position.

The process 1300 then presents the changed aircraft position and the future aircraft position when operating in the VNAV Autopilot Mode, via a display device communicatively coupled to the FMS (step 1306). In some embodiments, the process 1300 presents the changed aircraft position and the future aircraft position via Multi-Function Control and Display Unit (MCDU), Multi-Function Display (MFD), Primary Flight Display (PFD), Vertical Situation Display (VSD), or any other display device integrated into the aircraft. In some embodiments, the process 1300 presents the changed aircraft position and the future aircraft position via a personal computing device (e.g., tablet computer, smartphone, laptop) configured to store, maintain, and execute an Electronic Flight Bag (EFB) application for use onboard the aircraft.

The process 1300 also determines whether the future aircraft position is located on the flight path (decision 1308). When the future aircraft position is located on the flight path (the "Yes" branch of 1308), then the process 1300 continues engagement of the VNAV Autopilot Mode (step 1310). The future aircraft position and the predicted cross-track error are used to calculate an amount of divergence of the aircraft from the flight path caused by the use of the VNAV Autopilot Mode when the LNAV Autopilot Mode is disengaged. Since the location of the future aircraft position is located on the flight path, there is no divergence from the flight path indicated by the future aircraft position. Thus, the process 1300 maintains the VNAV Autopilot Mode.

However, when the future aircraft position is not located on the flight path (the "No" branch of 1308), the process 1300 disengages the VNAV Autopilot Mode of the FMS, based on the changed aircraft position and the future aircraft position for VNAV Autopilot Mode disengagement (step 1312). Since the future aircraft position is not located on the flight path, then the future aircraft position indicates divergence from the flight path, and in response, the process 1300 disengages the VNAV Autopilot Mode.

The process 1300 also calculates a descent path for the aircraft, after disengagement of the VNAV Autopilot Mode (step 1314). Although the VNAV Autopilot Mode descent path (VNAV DES path) does not change when the VNAV Autopilot Mode is disengaged, the aircraft no longer controls the descent path and vertical guidance is based on the current default state in non-managed mode conditions. Here, the process 1300 calculates the descent path based on the current default state in non-managed mode conditions. The process 1300 then presents the descent path, via the display device (step 1316). The process 1300 presents the changed aircraft position (step 1306), the future aircraft position (step 1306), and the descent path (step 1316). Thus, the process 1300 provides an intuitive visual representation of a current flight situation, onboard the aircraft.

Figure 14:
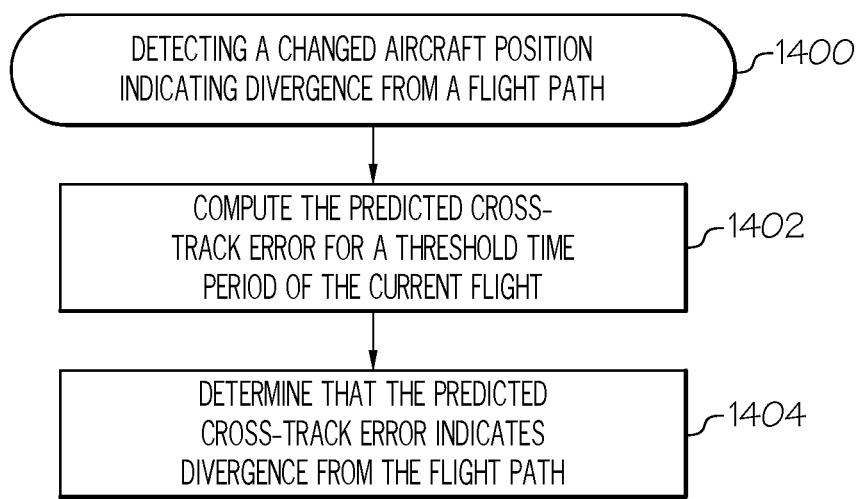
FIG. 14 is a flow chart that illustrates an embodiment of a process for detecting a changed aircraft position indicating divergence from a flight path, in accordance with the disclosed embodiments.

FIG. 14 is a flow chart that illustrates an embodiment of a process 1400 for detecting a changed aircraft position indicating divergence from a flight path, in accordance with the disclosed embodiments. It should be appreciated that the process 1400 described in FIG. 14 represents one embodiment of step 1302 described above in the discussion of FIG. 13, including additional detail.

First, the process 1400 computes a predicted cross-track error for a threshold time period of a current flight (step 1402), based on a current aircraft position and a current cross-track error. A current aircraft position is an actual location of the aircraft at the present time. The current cross-track error is a current error value associated with lateral navigation accuracy. In other words, the cross-track error is a quantity of deviation from the flight path, based on the current position of the aircraft. A predicted cross-track error is a calculated error value associated with lateral navigation accuracy when the aircraft is located at the future aircraft position. The predicted cross-track error is a quantity of deviation from the flight path, based on the future aircraft position. Specific formulas used to calculate the predicted cross-track error are described in detail with regard to FIGS. 3-6, and will not be redundantly described here.

Next, the process 1400 determines that the predicted cross-track error indicates divergence from the flight path (step 1404). Divergence from the flight path may be indicated by exceeding maximum allowed time period for deviation from the flight path, or by exceeding a maximum allowed distance for deviation from the flight path. In a first embodiment, the process 1400 determines that the predicted cross-track error indicates divergence from the flight path for a time period that is greater than the threshold time period. When the time period is greater than the threshold time period, the changed aircraft position indicates that the aircraft has diverged from the flight path for the threshold time period of the current flight. Thus, divergence of the aircraft from the flight path is determined to exceed the allowable limit set by the threshold time period. Divergence that exceeds the allowable limit may be termed "excessive divergence", and excessive divergence initiates disengagement of the VNAV Autopilot Mode of the aircraft Flight Management System (FMS) under conditions of an already-disengaged LNAV Autopilot Mode of the aircraft FMS.

In a second embodiment, the process 1400 determines that the predicted cross-track error is greater than a distance threshold. When the predicted cross-track error is greater than the distance threshold, the changed aircraft position indicates that the aircraft has crossed a distance threshold for a lateral containment area of the flight path. Thus, divergence of the aircraft from the flight path is determined to exceed the allowable limit set by the distance threshold. Divergence that exceeds the allowable limit may be termed "excessive divergence", and excessive divergence initiates disengagement of the VNAV Autopilot Mode of the aircraft Flight Management System (FMS) under conditions of an already-disengaged LNAV Autopilot Mode of the aircraft FMS.

The process 1400 computes a predicted cross-track error for a given time-out period, and then the process 1400 analyzes predicted cross-track error to determine whether the predicted cross-track error is within the vertical managed mode dropout corridor. In other words, the predicted cross-track error indicates that the divergence of the aircraft does not exceed an allowable divergence threshold for the flight path. In some embodiments, the vertical managed mode dropout corridor (i.e., the divergence threshold) is a fixed tolerance value. In other embodiments, the divergence threshold is operator modifiable, wherein the user-selected value depends on the need to maintain safe vertical managed mode (i.e., VNAV Autopilot Mode) operations when lateral managed mode (i.e., LNAV Autopilot Mode) is inactivated.

Figure 15:
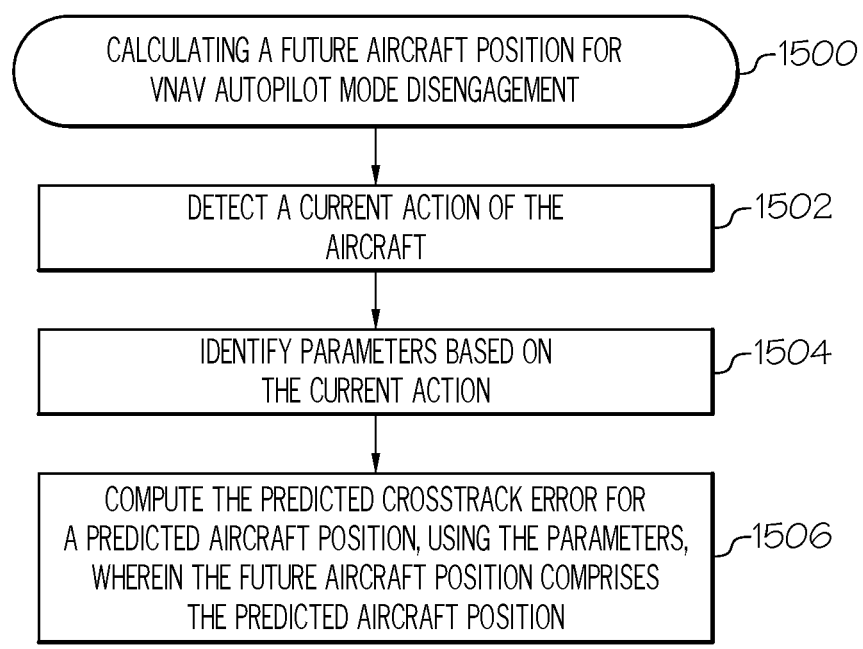
FIG. 15 is a flow chart that illustrates a first embodiment of a process for calculating a future aircraft position for VNAV Autopilot Mode disengagement, in accordance with the disclosed embodiments.

FIG. 15 is a flow chart that illustrates a first embodiment of a process 1500 for calculating a future aircraft position for VNAV Autopilot Mode disengagement, in accordance with the disclosed embodiments. It should be appreciated that the process 1500 described in FIG. 15 represents one embodiment of step 1304 described above in the discussion of FIG. 13, including additional detail. Contemplated herein are embodiments described previously with regard to FIGS. 4-5.

First, the process 1500 detects a current action of the aircraft (step 1502). The current action of the aircraft includes an action of the aircraft in relation to the flight path. In embodiments described previously with regard to FIG. 4, the current action includes the aircraft diverging away from the flight path by flying wings-level away from a curved path, wherein the flight path comprises the curved path. In embodiments described previously with regard to FIG. 5, the current action includes the aircraft converging toward the flight path by flying in lateral manual mode and using a particular bank angle to attain a target course or heading of a lateral flight plan, wherein the flight path comprises the lateral flight plan.

Next, the process 1500 identifies parameters based on the current action (step 1504). When the aircraft is diverging away from the flight path, parameters generally include, but are not limited to: a current aircraft position, the threshold time period, a predicted distance travelled from a point of LNAV disengagement, a ground speed of the aircraft, a current cross-track error computed at a time of LNAV disengagement, and a turn radius of a transition from the curved path. When the aircraft is converging toward the flight path, parameters generally include, but are not limited to: a current aircraft position, the threshold time period, a predicted distance travelled from a point of LNAV disengagement, a ground speed of the aircraft, and a current cross-track error computed at a time of LNAV disengagement. The current aircraft position is defined as an actual location of the aircraft at the present time. Current cross-track error is defined as a current error value associated with lateral navigation accuracy. In other words, the cross-track error is a quantity of deviation from the flight path, based on the current position of the aircraft.

The process 1500 then computes the predicted cross-track error for a predicted aircraft position using the parameters, wherein the future aircraft position comprises the predicted aircraft position (step 1506). A future aircraft position (i.e., a predicted aircraft position) is a potential location of the aircraft at a future time, which is calculated based on the current aircraft location at which the Lateral Navigation (LNAV) Autopilot Mode is disengaged and a current cross-track error. A predicted cross-track error is a calculated error value associated with lateral navigation accuracy when the aircraft is located at the future aircraft position. The predicted cross-track error is a quantity of deviation from the flight path, based on the future aircraft position.

In certain embodiments, the process 1500 also compares the predicted cross-track error to a threshold distance, and when the predicted cross-track error is less than the threshold distance, the process 1500 retains engagement of the VNAV autopilot mode. However, when the predicted cross-track error is greater than the threshold distance, the process 1500 disengages the VNAV Autopilot Mode, as described previously with regard to FIG. 13.

Figure 16:
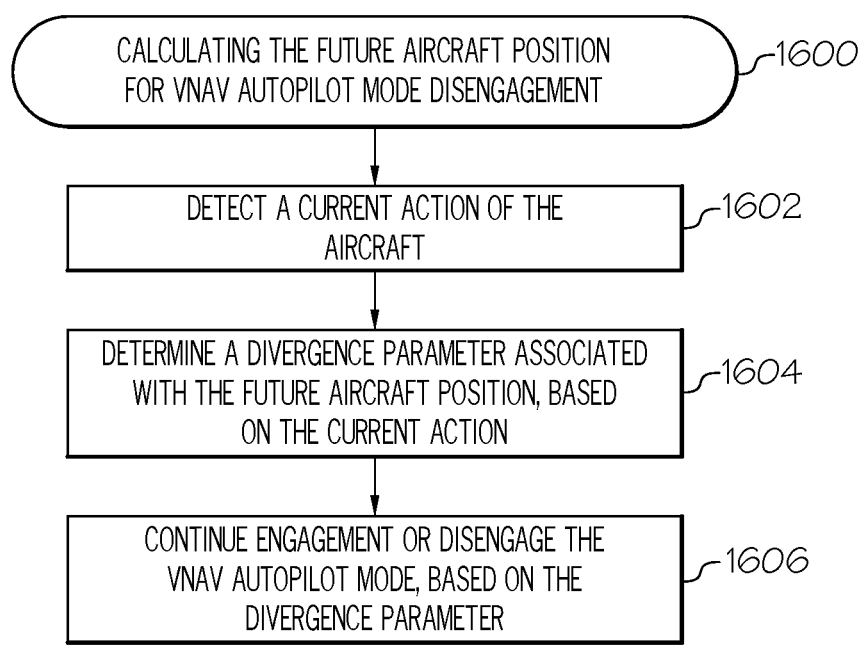
FIG. 16 is a flow chart that illustrates a second embodiment of a process for calculating a future aircraft position for VNAV Autopilot Mode disengagement, in accordance with the disclosed embodiments.

FIG. 16 is a flow chart that illustrates a second embodiment of a process 1600 for calculating a future aircraft position for VNAV Autopilot Mode disengagement, in accordance with the disclosed embodiments. It should be appreciated that the process 1600 described in FIG. 16 represents one embodiment of step 1304 described above in the discussion of FIG. 13, including additional detail. Contemplated herein are embodiments described previously with regard to FIGS. 3 and 6.

First, the process 1600 detects a current action of the aircraft (step 1602). The current action of the aircraft includes an action of the aircraft in relation to the flight path. In embodiments described previously with regard to FIG. 3, the current action includes the aircraft converging toward the flight path by flying wings-level toward a curved path, wherein the flight path comprises the curved path. In embodiments described previously with regard to FIG. 6, wherein the current action includes the aircraft diverging away from the flight path by flying away from a curved path and using a particular bank angle, wherein the flight path comprises the curved path.

Next, the process 1600 determines divergence parameters associated with a future aircraft position, based on the current action (step 1604). Divergence parameters include a future aircraft position associated with an outlier position. Embodiments of determining the divergence parameters include: (1) determining that the future aircraft position is located on the flight path, based on the current action; and (2) determining that the future aircraft position is associated with accumulated error, based on the current action.

In the first embodiment, the future aircraft position is located on the flight path, and thus, the future aircraft position does not indicate any amount of divergence from the flight path. Thus, the future aircraft position on the flight path is associated with very low, or zero, divergence. In the second embodiment, the future aircraft position is associated with a very high level of divergence that far exceeds a divergence threshold (i.e., a level of allowable divergence from the flight path. In the example described in FIG. 6, the aircraft is diverging from the flight path using a turn angle (|Φ|) that is greater than one degree: (|Φ|>1 degree), causing increased divergence. Increased divergence indicates that maintaining an engaged and active vertical managed mode results in the accumulation of a high level of error in the absence of an active managed lateral mode.

The process 1600 then continues engagement or disengages the VNAV Autopilot Mode, based on the divergence parameter (step 1606). In the first embodiment, the future aircraft position is associated with no divergence, and thus, the VNAV Autopilot Mode is not disengaged. In the second embodiment, the future aircraft position is associated with a high level of accumulated error due to the turn angle of the aircraft, and the vertical managed mode (i.e., VNAV Autopilot Mode) is disengaged immediately to prevent the increased accumulation of error.

Figure 17:
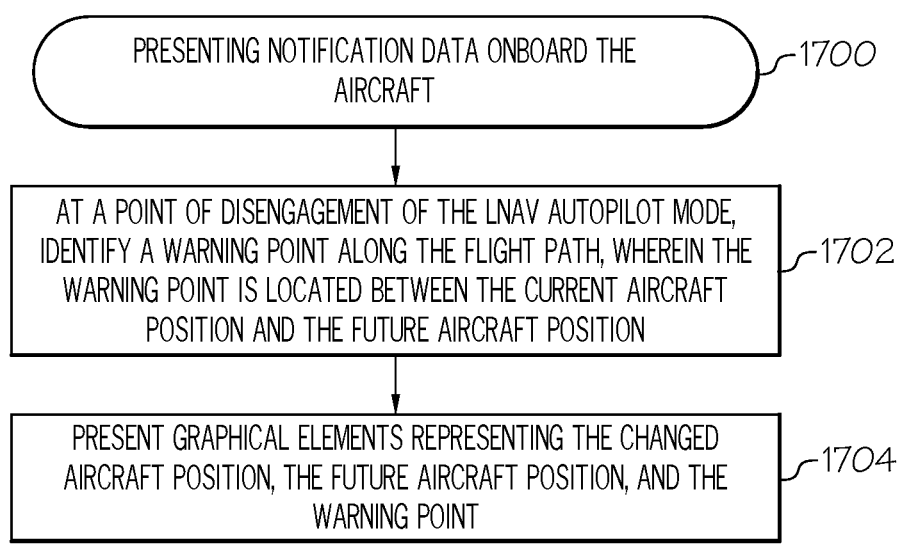
FIG. 17 is a flow chart that illustrates an embodiment of a process for presenting notification data onboard the aircraft, in accordance with the disclosed embodiments.

FIG. 17 is a flow chart that illustrates an embodiment of a process 1700 for presenting notification data onboard the aircraft, in accordance with the disclosed embodiments. Contemplated herein are embodiments described previously with regard to FIGS. 7-12. First, at a point of disengagement of a Lateral Navigation (LNAV) Autopilot Mode, the process 1700 identifies a warning point along the flight path, wherein the warning point is located between the current aircraft position and the future aircraft position (step 1702). The process 1700 computes the location of the warning point using the current aircraft position, the current cross-track error, the previously-calculated future aircraft position, and the predicted cross-track error (see FIGS. 13-16 and associated description). The warning point is a location that the aircraft passes through during flight, wherein the warning point is located between the current aircraft position and the future aircraft position. Generally, the warning point is a location at which notification of the upcoming point of VNAV Autopilot Mode disengagement is presented, such that a flight crew is made aware and may take action.

The process 1700 then presents graphical elements representing the changed aircraft position, the future aircraft position, and the warning point (step 1704). Here, the process 1700 provides visual indications of the current aircraft position (i.e., the changed aircraft position), the future aircraft position, and the upcoming warning point, to enhance flight crew situational awareness. In some embodiments, when the aircraft reaches the warning point during the current flight, the process 1700 presents a text notification of the future aircraft position for VNAV Autopilot Mode disengagement, via a Primary Flight Display (PFD), wherein the display device comprises the PFD. In some embodiments, when the aircraft reaches the warning point during the current flight, the process 1700 presents a second graphical element indicating the future aircraft position for VNAV Autopilot Mode disengagement, via a Vertical Situation Display (VSD), wherein the display device comprises the VSD. Other embodiments of the process 1700 may present any type of notification, warning, alert, or message that includes any combination of graphical elements, text, auditory alerts, or the like.

The various tasks performed in connection with processes 1300-1700 may be performed by software, hardware, firmware, or any combination thereof. For illustrative purposes, the preceding description of processes 1300-1700 may refer to elements mentioned above in connection with FIGS. 1-12. In practice, portions of processes 1300-1700 may be performed by different elements of the described system. It should be appreciated that processes 1300-1700 may include any number of additional or alternative tasks, the tasks shown in FIGS. 13-17 need not be performed in the illustrated order, and processes 1300-1700 may be incorporated into a more comprehensive procedure or process having additional functionality not described in detail herein. Moreover, one or more of the tasks shown in FIGS. 13-17 could be omitted from embodiments of the processes 1300-1700 as long as the intended overall functionality remains intact.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

The preceding description refers to elements or nodes or features being "connected" or "coupled" together. As used herein, unless expressly stated otherwise, "coupled" means that one element/node/feature is directly or indirectly joined to (or directly or indirectly communicates with) another element/node/feature, and not necessarily mechanically. Likewise, unless expressly stated otherwise, "connected" means that one element/node/feature is directly joined to (or directly communicates with) another element/node/feature, and not necessarily mechanically. Thus, although the schematic shown in FIG. 2 depicts one exemplary arrangement of elements, additional intervening elements, devices, features, or components may be present in an embodiment of the depicted subject matter.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for providing mode data, onboard an aircraft, during operation of a Flight Management System (FMS) using a Vertical Navigation (VNAV) Autopilot Mode, the method comprising:
   when the FMS has disengaged a Lateral Navigation (LNAV) Autopilot Mode,
      detecting a changed aircraft position indicating divergence from a flight path,
   wherein the changed aircraft position comprises a current aircraft position;
      calculating a future aircraft position for VNAV Autopilot Mode disengagement, based on the changed aircraft position, a predicted cross-track error, and the divergence from the flight path;
      presenting the changed aircraft position and the future aircraft position when operating in the VNAV Autopilot Mode, via a display device communicatively coupled to the FMS;
      when the future aircraft position is not on the flight path, disengaging the VNAV Autopilot Mode of the FMS, based on the changed aircraft position and the future aircraft position for VNAV Autopilot Mode disengagement;
      calculating a descent path for the aircraft, after disengagement of the VNAV Autopilot Mode; and
      presenting the descent path, via the display device.

2. The method of claim 1, wherein detecting the changed aircraft position indicating the divergence from the flight path further comprises:
   computing the predicted cross-track error for a threshold time period of a current flight; and
   determining that the predicted cross-track error indicates the divergence from the flight path for a time period that is greater than the threshold time period;
   wherein, when the time period is greater than the threshold time period, the changed aircraft position indicates that the aircraft has diverged from the flight path for the threshold time period of the current flight.

3. The method of claim 1, wherein detecting the changed aircraft position indicating the divergence from the flight path further comprises:
   computing the predicted cross-track error for a threshold time period of a current flight; and
   determining that the predicted cross-track error is greater than a distance threshold;
   wherein, when the predicted cross-track error is greater than the distance threshold, the changed aircraft position indicates that the aircraft has crossed a boundary for a lateral containment area of the flight path.

4. The method of claim 1, wherein calculating the future aircraft position for VNAV Autopilot Mode disengagement further comprises:
   detecting a current action of the aircraft, wherein the current action includes the aircraft converging toward the flight path by flying wings-level toward a curved path, wherein the flight path comprises the curved path;
   determining that the future aircraft position is located on the flight path, based on the current action; and
   continuing engagement of the VNAV Autopilot Mode, based on the future aircraft position being located on the flight path.

5. The method of claim 1, wherein calculating the future aircraft position for VNAV Autopilot Mode disengagement further comprises:
   detecting a current action of the aircraft, wherein the current action includes the aircraft diverging away from the flight path by flying wings-level away from a curved path, wherein the flight path comprises the curved path;
   identifying parameters based on the current action, the parameters comprising at least the current aircraft position, a threshold time period, a predicted distance travelled from a point of LNAV disengagement, a ground speed of the aircraft, a current cross-track error computed at a time of LNAV disengagement, and a turn radius of a transition from the curved path; and
   computing a predicted cross track error for a predicted aircraft position, using the parameters, wherein the future aircraft position comprises the predicted aircraft position.

6. The method of claim 1, wherein calculating the future aircraft position for VNAV Autopilot Mode disengagement further comprises:
   detecting a current action of the aircraft, wherein the current action includes the aircraft converging toward the flight path by flying in lateral manual mode and using a particular bank angle to attain a target course or heading of a lateral flight plan, wherein the flight path comprises the lateral flight plan;
   identifying parameters based on the current action, the parameters comprising at least the current aircraft position, a threshold time period, a predicted distance travelled from a point of LNAV disengagement, a ground speed of the aircraft, and a current cross-track error computed at a time of LNAV disengagement; and
   computing the predicted cross-track error for a predicted aircraft position, using the parameters, wherein the future aircraft position comprises the predicted aircraft position.

7. The method of claim 6, further comprising:
   comparing the predicted cross-track error to a threshold distance; and
   when the predicted cross-track error is less than the threshold distance, retaining engagement of the VNAV Autopilot Mode.

8. The method of claim 1, wherein calculating the future aircraft position for VNAV Autopilot Mode disengagement further comprises:
   detecting a current action of the aircraft, wherein the current action includes the aircraft diverging away from the flight path by flying away from a curved path and using a particular bank angle, wherein the flight path comprises the curved path;
   determining that the future aircraft position is associated with accumulated error, based on the current action; and
   disengaging the VNAV Autopilot Mode, based on the future aircraft position being associated with the accumulated error.

9. The method of claim 1, further comprising:
at a point of disengagement of the LNAV Autopilot Mode, identifying a warning point along the flight path, wherein the warning point is located between the current aircraft position and the future aircraft position; and
presenting graphical elements representing the changed aircraft position, the future aircraft position, and the warning point; and
when the aircraft reaches the warning point during a current flight, presenting a text notification of the future aircraft position for VNAV Autopilot Mode disengagement, via a Primary Flight Display (PFD), wherein the display device comprises the PFD.

10. The method of claim 1, further comprising:
at a point of disengagement of the LNAV Autopilot Mode, identifying a warning point along the flight path, wherein the warning point is located between the current aircraft position and the future aircraft position; and
presenting graphical elements representing the changed aircraft position, the future aircraft position, and the warning point; and
when the aircraft reaches the warning point during a current flight, presenting a second graphical element indicating the future aircraft position for VNAV Autopilot Mode disengagement, via a Vertical Situation Display (VSD), wherein the display device comprises the VSD.

11. A system for providing mode data, onboard an aircraft, during operation of a Flight Management System (FMS) using a Vertical Navigation (VNAV) Autopilot Mode, the system comprising:
a system memory element;
the Flight Management System (FMS), configured to:
engage and disengage a Lateral Navigation (LNAV) Autopilot Mode during flight; and
engage and disengage the VNAV Autopilot Mode during the flight, wherein the LNAV Autopilot Mode and the VNAV Autopilot Mode comprise decoupled modes configured to operate independently;
a display device, configured to present an aircraft position during the flight; and
at least one processor, communicatively coupled to the system memory element, the FMS, and the display device, the at least one processor configured to:
when the FMS has disengaged the Lateral Navigation (LNAV) Autopilot Mode,
detect a changed aircraft position indicating divergence from a flight path, wherein the changed aircraft position comprises a current aircraft position;
calculate a future aircraft position for VNAV Autopilot Mode disengagement, based on the changed aircraft position, a predicted cross-track error, and the divergence from the flight path;
present the changed aircraft position and the future aircraft position when operating in the VNAV Autopilot Mode, via the display device communicatively coupled to the FMS;
when the future aircraft position is not on the flight path, disengage the VNAV Autopilot Mode of the FMS, based on the changed aircraft position and the future aircraft position for VNAV Autopilot Mode disengagement;
calculate a descent path for the aircraft, after disengagement of the VNAV Autopilot Mode; and
present the descent path, via the display device.

12. The system of claim 11, wherein the at least one processor is further configured to detect the changed aircraft position indicating the divergence from the flight path, by:
computing the predicted cross-track error for a threshold time period of a current flight; and
determining that the predicted cross-track error indicates the divergence from the flight path for a time period that is greater than the threshold time period;
wherein, when the time period is greater than the threshold time period, the changed aircraft position indicates that the aircraft has diverged from the flight path for the threshold time period of the current flight.

13. The system of claim 11, wherein the at least one processor is further configured to detect the changed aircraft position indicating the divergence from the flight path, by:
computing the predicted cross-track error for a threshold time period of a current flight; and
determining that the predicted cross-track error is greater than a distance threshold;
wherein, when the predicted cross-track error is greater than the distance threshold, the changed aircraft position indicates that that the aircraft has crossed a boundary for a lateral containment area of the flight path.

14. The system of claim 11, wherein the at least one processor is further configured to calculate the future aircraft position for VNAV Autopilot Mode disengagement, by:
detecting a current action of the aircraft, wherein the current action includes the aircraft converging toward the flight path by flying wings-level toward a curved path, wherein the flight path comprises the curved path;
determining that the future aircraft position is located on the flight path, based on the current action; and
continuing engagement of the VNAV Autopilot Mode, based on the future aircraft position being located on the flight path.

15. The system of claim 11, wherein the at least one processor is further configured to calculate the future aircraft position for VNAV Autopilot Mode disengagement, by:
detecting a current action of the aircraft, wherein the current action includes the aircraft diverging away from the flight path by flying wings-level away from a curved path, wherein the flight path comprises the curved path;
identifying parameters based on the current action, the parameters comprising at least the current aircraft position, a threshold time period, a predicted distance travelled from a point of LNAV disengagement, a ground speed of the aircraft, a current cross-track error computed at a time of LNAV disengagement, and a turn radius of a transition from the curved path; and
computing a predicted cross track error for a predicted aircraft position, using the parameters, wherein the future aircraft position comprises the predicted aircraft position.

16. The system of claim 11, wherein the at least one processor is further configured to calculate the future aircraft position for VNAV Autopilot Mode disengagement, by:
detecting a current action of the aircraft, wherein the current action includes the aircraft converging toward the flight path by flying in lateral manual mode and using a particular bank angle to attain a target course or heading of a lateral flight plan, wherein the flight path comprises the lateral flight plan;

identifying parameters based on the current action, the parameters comprising at least the current aircraft position, a threshold time period, a predicted distance travelled from a point of LNAV disengagement, a ground speed of the aircraft, and a current cross-track error computed at a time of LNAV disengagement; and computing the predicted cross-track error for a predicted aircraft position, using the parameters, wherein the future aircraft position comprises the predicted aircraft position.

17. The system of claim 16, wherein the at least one processor is further configured to:
compare the predicted cross-track error to a threshold distance; and
when the predicted cross-track error is less than the threshold distance, retain engagement of the VNAV Autopilot Mode.

18. The system of claim 11, wherein the at least one processor is further configured to calculate the future aircraft position for VNAV Autopilot Mode disengagement, by:
detecting a current action of the aircraft, wherein the current action includes the aircraft diverging away from the flight path by flying away from a curved path and using a particular bank angle, wherein the flight path comprises the curved path;
determining that the future aircraft position is associated with accumulated error, based on the current action; and
disengaging the VNAV Autopilot Mode, based on the future aircraft position being associated with the accumulated error.

19. The system of claim 11, wherein, at a point of disengagement of the LNAV Autopilot Mode, the at least one processor is further configured to:
identify a warning point along the flight path, wherein the warning point is located between the current aircraft position and the future aircraft position; and
present graphical elements representing the changed aircraft position, the future aircraft position, and the warning point; and
when the aircraft reaches the warning point during a current flight, present a text notification of the future aircraft position for VNAV Autopilot Mode disengagement, via a Primary Flight Display (PFD), wherein the display device comprises the PFD.

20. The system of claim 11, wherein, at a point of disengagement of the LNAV Autopilot Mode, the at least one processor is further configured to:
identify a warning point along the flight path, wherein the warning point is located between the current aircraft position and the future aircraft position; and
present graphical elements representing the changed aircraft position, the future aircraft position, and the warning point; and
when the aircraft reaches the warning point during a current flight, present a second graphical element indicating the future aircraft position for VNAV Autopilot Mode disengagement, via a Vertical Situation Display (VSD), wherein the display device comprises the VSD.

* * * * *